(12) United States Patent
Okitsu et al.

(10) Patent No.: US 7,930,445 B2
(45) Date of Patent: Apr. 19, 2011

(54) COMPUTER SYSTEM USING REMOTE I/O AND I/O DATA TRANSFER METHOD

(75) Inventors: Jun Okitsu, Kodaira (JP); Yoshiko Yasuda, Tokorozawa (JP); Takashige Baba, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 11/896,757

(22) Filed: Sep. 5, 2007

(65) Prior Publication Data

US 2008/0256266 A1 Oct. 16, 2008

(30) Foreign Application Priority Data

Sep. 6, 2006 (JP) ................................. 2006-241238

(51) Int. Cl.
G06F 13/28 (2006.01)
G06F 15/16 (2006.01)
G06F 15/167 (2006.01)

(52) U.S. Cl. ............... 710/26; 710/22; 710/23; 710/27; 709/212; 709/217; 709/218; 709/219

(58) Field of Classification Search ........................ None
See application file for complete search history.

(56) References Cited

U.S. PATENT DOCUMENTS

| | | | | |
|---|---|---|---|---|
| 5,850,571 A | * | 12/1998 | Odom et al. ................ | 710/27 |
| 5,864,876 A | * | 1/1999 | Rossum et al. ............... | 711/206 |
| 5,983,303 A | * | 11/1999 | Sheafor et al. ............... | 710/315 |
| 6,081,851 A | * | 6/2000 | Futral et al. ................. | 710/23 |
| 6,128,674 A | * | 10/2000 | Beukema et al. ............. | 710/23 |
| 6,988,160 B2 | * | 1/2006 | Daniel et al. ................ | 710/310 |
| 7,260,669 B2 | * | 8/2007 | Honmura ..................... | 711/1 |
| 2006/0195675 A1 | * | 8/2006 | Arndt et al. .................. | 711/200 |
| 2007/0067432 A1 | * | 3/2007 | Tarui et al. ................... | 709/223 |

FOREIGN PATENT DOCUMENTS

| | | |
|---|---|---|
| JP | 8-30544 | 7/1994 |
| JP | 8-95899 | 9/1994 |
| JP | 2002-215563 | 1/2001 |

OTHER PUBLICATIONS

"PCI Express Switching and Remote I/O in the Data Center", Xyratex, Feb. 2005, pp. 1-10, http://www.asi-sig.org/education/whitepapers/Remote_IO_WhitePaper.pdf.
Christo, Stephen et al. "Application Examples Enabling Virtual IO and Storage", ASI SIG Advanced Switching Interconnection SIG, Jun. 15, 2006, pp. 1-31, http://www.ais-sig.org/education/presentations/3_ASI_Apps_Examples_StarGen.pdf.

* cited by examiner

*Primary Examiner* — Tanh Q Nguyen
(74) *Attorney, Agent, or Firm* — Stites & Harbison PLLC; Juan Carlos A. Marquez, Esq.

(57) ABSTRACT

To improve throughput in data transfer in a remote I/O system, this invention provides a computer system including: a host computer; a device which communicates with the host computer; and a network which connects the host computer and the device, in which the device is coupled to the network via a device bridge including a bridge memory, and the host computer includes a host memory and a device driver. The device driver writes, when at least one of data and an address is written in the host memory, in the bridge memory the at least one of the data and address stored through the writing in the host memory; and sends a data transfer request to the device bridge, and the device bridge reads, upon reception of the data transfer request, an address from a predetermined area; and reads data from an area that is indicated by the read address.

3 Claims, 19 Drawing Sheets

ADDRESS CONVERSION TABLE 122

| # | HOST MEMORY | BRIDGE MEMORY ONE | BRIDGE MEMORY TWO |
|---|---|---|---|
| 1 | FC000000 | 12000000 | - |
| 2 | D0000000 | 20000000 | - |
| 3 | C0000000 | - | 00800000 |
| 4 | : | : | : |

*FIG. 2*

COMPUTER SYSTEM USING REMOTE I/O AND I/O DATA TRANSFER METHOD

CLAIM OF PRIORITY

The present application claims priority from Japanese application JP2006-241238 filed on Sep. 6, 2006, the content of which is hereby incorporated by reference into this application.

BACKGROUND

This invention relates to data transfer in a computer system. In particular, the technique disclosed herein relates to improving the rate of data transfer via a switch fabric.

There have been proposed systems which support remote I/O by connecting a host computer and an I/O device through a switch fabric (see, for example, an article written by Paul Millard et al., titled "PCI Express Switching and Remote I/O in the Data Center", published on February 2005 through xyratex, ASI-SIG, retrieved on Aug. 3, 2006 at http://www.asi-sig.org/education/whitepapers/Remote_IO_WhitePapaer.pdf. and an article written by Stephen Christo et al., titled "Application Examples Enabling Virtual IO and Storage", published on Jun. 15, 2006 through xyratex, ASI-SIG, retrieved on Aug. 3, 2006 at http://www.asi-sig.org/education/presentations/3_ASI_Apps_Examples_StarGen.pdf). Such systems (hereinafter referred to as remote I/O systems) consolidate resources and provide flexible I/O, thereby making it possible to cut the investment cost.

Direct memory access (DMA) transfer is a well known method of data transfer in computer systems (see, for example, JP 2002-215563 A, JP 08-95899 A, and JP 08-30544 A). With DMA transfer, where data transfer is executed between a device and a memory without the intermediation of a CPU, data can be transferred at high speed.

SUMMARY

In remote I/O systems, communications for I/O are made through a switch fabric. This increases latency and, as a result, lowers I/O throughput.

Several methods including transferring data in bursts have been proposed to improve I/O throughput. For instance, a DMA controller described in JP 2002-215563 A has a buffer and accumulates data in the buffer to execute burst transfer, thus improving I/O throughput. A DMA transfer control device described in JP 08-95899 A has multiple DMA controllers which are used separately for different uses, and thus improves I/O throughput. A DMA transfer device described in JP 08-30544 A improves latency, and hence I/O throughput, by omitting DMA address read when successive pieces of data are to be communicated. The I/O throughput of a remote I/O system can be improved by applying those techniques to the remote I/O system.

However, in a system that is used as a network router or a system in which multiple virtual machines share one I/O device, for example, I/O data tends to be small in size (in other words, the granularity is small). The proportion of the address size to the data size is large and the relativity between pieces of data is low in data transfer of small granularity, which does not go well with transferring data in batch nor omitting address read. It is therefore difficult to improve I/O throughput by applying the techniques of JP 2002-215563 A, JP 08-95899 A, and JP 08-30544 A to small granularity data transfer.

According to a representative invention disclosed in this application, there is provided a computer system, comprising: a host computer; a device which communicates with the host computer; and a network which connects the host computer and the device, wherein the device is coupled to the network via a device bridge, wherein the device bridge includes a bridge memory, wherein the host computer includes a host memory and a device driver, which controls data transfer to the device, wherein the device driver is configured to: when at least one of data and an address is written in the host memory, write in the bridge memory the at least one of the data and address stored through writing in the host memory; and send a data transfer request to the device bridge, and wherein the device bridge is configured to: upon reception of the data transfer request, read an address from a predetermined area; and read data from an area that is indicated by the read address.

According to an embodiment of this invention, the I/O throughput in small granularity data transfer can be improved.

BRIEF DESCRIPTION OF THE DRAWINGS

FIG. 2 is an explanatory diagram of an address conversion table according to the first embodiment of this invention.

DETAILED DESCRIPTION OF THE PREFERRED EMBODIMENTS

Figure 1:
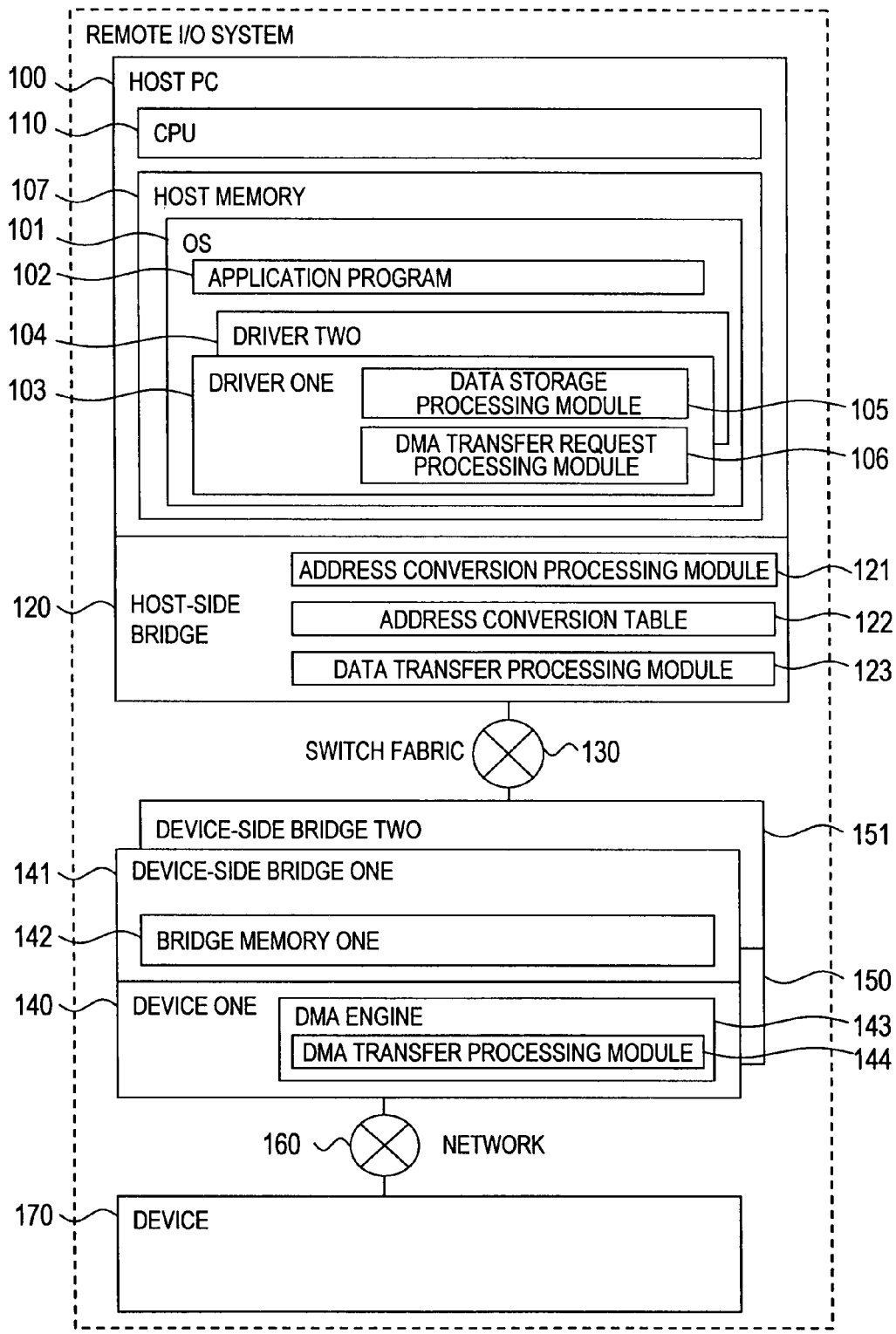
FIG. 1 is a block diagram of a remote I/O system according to a first embodiment of this invention.

FIG. 1 is a block diagram of a remote I/O system according to a first embodiment of this invention.

The remote I/O system of this embodiment contains, at least, a host PC 100, a host-side bridge 120, a device 140, a device-side bridge 141, a device 150, a device-side bridge 151, and a device 170. The host PC 100, the device 140, and the device 150 are connected to the host-side bridge 120, the device-side bridge 141, and the device-side bridge 151, respectively. The host-side bridge 120, the device-side bridge 141, and the device-side bridge 151 are interconnected via a switch fabric 130. The device 170 is connected to the device 140 via a network 160.

The host PC 100 is a computer that comprises at least a CPU 110 and a host memory 107.

The CPU 110 of the host PC 100 is a processor that executes various types of software stored in the host memory 107.

The host memory 107 stores at least an operating system (OS) 101, an application program 102, a driver 103, and a driver 104. The host memory 107 also stores temporary data including data that is to be transferred between the host PC 100 and the device 140 or other devices.

The application program 102 is a program running on the OS 101 to implement a predetermined operation.

The drivers 103 and 104 are software (so-called device drivers) executed to enable the OS 101 to control data transfer to the devices 140 and 150. In FIG. 1, the driver 103 and the driver 104 are shown as "Driver One" and "Driver Two", respectively. The driver 103 in this embodiment contains at least a data storage processing module 105 and a DMA transfer request processing module 106. These processing modules are modules that constitute the driver 103. The driver 104 may contain a data storage processing module (not shown) and a DMA transfer request processing module (not shown) like the driver 103 does.

The drivers 103 and 104 are executed by the CPU 110. Processing that is executed by the driver 103 or 104 in the following description is therefore actually executed by the CPU 110.

The host-side bridge 120 executes processing for connecting the host PC 100 to the switch fabric 130 (e.g., protocol conversion processing). The host-side bridge 120 in this embodiment contains at least an address conversion processing module 121, an address conversion table 122, and a data transfer processing module 123.

The host-side bridge 120 may be contained within the host PC 100.

The address conversion table 122 is stored in a memory (not shown) inside the host-side bridge 120. The address conversion processing module 121 and the data transfer processing module 123 may be hardware constituting the host-side bridge 120, or may be programs stored in the memory (not shown) and executed by a processor (not shown) inside the host-side bridge 120.

The switch fabric 130 has one or more switches (not shown) for switching data transfer paths between the host PC 100 and the device 140 or 150. The host-side bridge 120 and the device-side bridge 141 or 151 communicate with each other via the switch fabric 130 under an arbitrary protocol. For example, the host-side bridge 120 and the device-side bridge 141 or 151 may execute PCI-EXPRESS communications. The switch or switches constituting the switch fabric 130 in this case may be compliant with the Advanced Switching standard.

The switch fabric 130 makes flexible I/O possible between the host PC 100 and the device 140 or 150. On the other hand, the switch fabric 130 increases the data I/O latency since data transferred between the host PC 100 and the device 140 or 150 has to pass through the one or more switches of the switch fabric 130.

This embodiment shows the switch fabric 130 as an example of the network that connects the host PC 100 and the devices 140 and 150, but the switch fabric 130 can be replaced with any other type of network. This invention is applicable no matter what type of path is used to connect the host PC 100 and the devices 140 and 150.

The devices 140 and 150 execute data I/O between the host PC 100 and an appliance (e.g., the device 170) connected to the network 160. This embodiment takes as an example a case in which the devices 140 and 150 are network interface cards (NICs) for connecting the host PC 100 to the network 160.

The device 140 comprises a DMA engine 143.

The device-side bridge 141 executes processing for connecting the device 140 to the switch fabric 130. The device-side bridge 141 in this embodiment has at least a bridge memory 142.

The DMA engine 143 comprises at least a DMA transfer processing module 144, which executes Direct Memory Access (DMA) transfer.

FIG. 1 shows the device 140, the device-side bridge 141, and the bridge memory 142 as "Device One", "Device-side Bridge One", and "Bridge Memory One", respectively.

The device-side bridge 151 is shown in FIG. 1 as "Device-side Bridge Two". The device 150 may comprise a DMA engine (not shown) and Bridge Memory Two (not shown) similarly to the device 140.

The device-side bridges 141 and 151 may be contained within the devices 140 and 150, respectively.

While FIG. 1 shows two devices 140 and 150, the remote I/O system according to this embodiment may contain as many devices as necessary.

The network 160 connects the device 140 and the device 170 to each other. The network 160 is, for example, a Local Area Network (LAN), or may be any other type of network.

The device 170 connected to the network 160 communicates with the host PC 100. The device 170 may be any kind of peripheral equipment. Alternatively, the device 170 may be an NIC like the device 140. The device 170 in this case may be connected to a host PC (not shown) other than the host PC 100 via a switch fabric (not shown) other than the switch fabric 130, or connected directly to the host PC (not shown) other than the host PC 100.

FIG. 2 is an explanatory diagram of the address conversion table 122 according to the first embodiment of this invention.

The address conversion table 122 is used to manage the association relation between an address in the host memory 107 and an address in the bridge memory 142 or other bridge memories. As will be described later, the address conversion processing module 121 uses the address conversion table 122 to convert an address in the host memory 107 into its associated address in the bridge memory 142 or the like. In other words, a storage area of the host memory 107 is mapped onto the bridge memory 142 or other bridge memories through the address conversion table 122.

The address conversion table 122 in this embodiment contains columns for an entry number 201, a host memory address 202, a bridge memory one address 203, and a bridge memory two address 204.

The entry number 201 is a number which uniquely identifies each entry (line) registered in the address conversion table 122.

An address in the host memory 107 is registered as the host memory address 202.

An address in the bridge memory 142 that is associated with an address registered as the host memory address 202 is registered as the bridge memory one address 203.

Registered as the bridge memory two address 204 is an address in the Bridge Memory Two (not shown) within the device-side bridge 151 that is associated with an address registered as the host memory address 202.

The remote I/O system according to this embodiment may contain an additional device, which is connected to the switch fabric 130. Then a column for a bridge memory that the additional device has is added to the address conversion table 122.

In the example of FIG. 2, "FC000000" and "12000000" are registered as the host memory address 202 and the bridge memory one address 203, respectively, in an entry whose entry number 201 is "1". This indicates that the address "FC000000" in the host memory 107 is associated with the address "12000000" in the bridge memory 142.

An address registered as the host memory address 202, the bridge memory one address 203, or the bridge memory two address 204 may be the head address of a predetermined address range. In this case, a predetermined range of addresses headed by the address "FC000000" in the host memory 107 is associated with a given predetermined range of addresses headed by the address "12000000" in the bridge memory 142.

Similarly, an entry whose entry number 201 is "2" shows that an address "D0000000" in the host memory 107 is associated with an address "20000000" in the bridge memory 142. An entry whose entry number 201 is "3" shows that an address "C0000000" in the host memory 107 is associated with an address "00800000" in Bridge Memory Two inside the device-side bridge 151.

The address conversion table 122 is created at the time the remote I/O system is initialized. For instance, management software (not shown) of the switch fabric 130 or the like may obtain information about the device 140 and other devices connected to the switch fabric 130 as well as information about the bridge memory 142 and other bridge memories, and creates the address conversion table 122 based on the obtained information.

Figure 3:
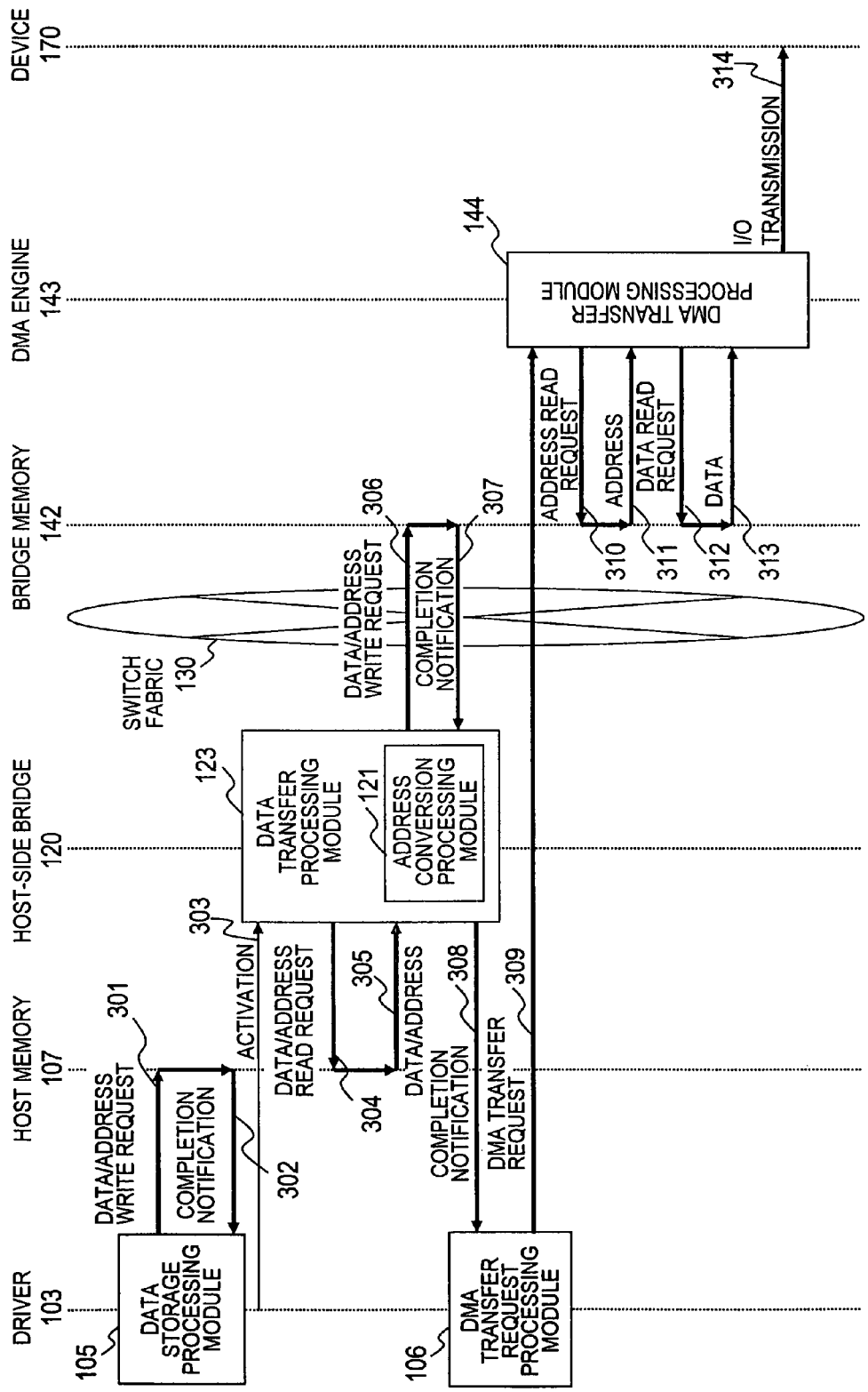
FIG. 3 is a sequence diagram showing data transfer processing that is executed in the remote I/O system according to the first embodiment of this invention.

FIG. 3 is a sequence diagram showing data transfer processing that is executed in the remote I/O system according to the first embodiment of this invention.

Specifically, FIG. 3 shows a series of processing steps executed to transfer data from the host PC 100 to the device 170.

The processing shown in FIG. 3 is started when the driver 103 receives from the OS 101 or the application program 102 a request to transfer data to the device 170.

First, the data storage processing module 105 of the driver 103 issues a write request for storing in the host memory 107 data that is to be transferred (i.e., data requested to be transferred by the data transfer request) and an address in the host memory 107 where this data is to be stored (Step 301). As a result, the data to be transferred is stored in some area within the host memory 107 (specifically, an area that is within a range allocated by the OS 101 and that is indicated by the address), and the value of the address at which the data is now stored is stored in an area within the host memory 107 that is indicated by another address. After the data and the address are stored, the driver 103 receives a completion notification (Step 302).

Next, the driver 103 activates the data transfer processing module 123 of the host-side bridge 120 (Step 303).

The data transfer processing module 123 of the host-side bridge 120 issues a read request for reading from the host memory 107 the data to be transferred and the address in the host memory 107 at which the data is currently stored (Step 304). As a result, the data to be transferred and the address in the host memory 107 at which the data is currently stored are read from the host memory 107 onto the host-side bridge 120 (Step 305). In short, the data and address written in the host memory 107 in Step 301 are read in Step 305.

Using the address conversion table 122, the address conversion processing module 121 of the host-side bridge 120 converts the address in the host memory 107 read in Step 305 into its associated address in the bridge memory 142 (see Step 502 of FIG. 5 which will be described later). For example, when the address read in Step 305 is "FC000000", the read address is converted into "12000000" based on the address conversion table 122 of FIG. 2.

Next, the data transfer processing module 123 issues a write request for storing in the bridge memory 142 the data to be transferred (the data read in Step 305) and the address obtained by the conversion in the address conversion processing module 121 (Step 306). As a result, the data read in Step 305 is stored in an area within the bridge memory 142 that is indicated by the address obtained by the conversion in the address conversion processing module 121. Also, the value of the address obtained by the conversion in the address conversion processing module 121 is stored in an area of the bridge memory 142 that is indicated by a predetermined address.

After the data and address requested to be written in Step 306 are stored, the host-side bridge 120 receives a completion notification (Step 307).

The write request in Step 306 and the completion notification in Step 307 are transferred via the switch fabric 130. However, since the data transfer processing module 123 knows in advance which data is to be transferred and at which address in the bridge memory 142 the data is to be stored, the data and the address can both be stored in the bridge memory 142 with one write request.

Receiving the completion notification of Step 307, the data transfer processing module 123 sends a completion notification to the driver 103 (Step 308).

Upon reception of the completion notification in Step 308, the DMA transfer request processing module 106 of the driver 103 sends a DMA transfer request to the DMA transfer processing module 144 of the DMA engine 143 (Step 309).

Receiving the DMA transfer request of Step 309, the DMA transfer processing module 144 issues an address read request to the bridge memory 142 (Step 310). As a result, an address stored in the bridge memory 142 is read (Step 311). The address read in Step 311 is the address that has been stored as requested by the write request of Step 306.

The DMA transfer processing module 144 next issues a data read request to the bridge memory 142 (Step 312). This read request is for data at the address read in Step 311. As a result, the data to be transferred is read from an area of the bridge memory 142 that is indicated by the address read in Step 311 (Step 313). The data read in Step 313 is the data that has been stored as requested by the write request of Step 306.

The DMA transfer processing module 144 then sends the data read in Step 313 to the device 170 (Step 314). In sending the read data to the device 170, the device 140 may execute such processing as protocol conversion in order to send the data via the network 160.

Data transfer from the host PC 100 to the device 170 is completed as above.

In Step 306, the data transfer processing module 123 requests to write in the bridge memory 142 the data to be transferred and an address in the bridge memory 142 at which the data is to be stored. However, the data transfer processing module 123 may request to write in the bridge memory 142 only an address in the host memory 107 at which the data to be transferred is currently stored instead of writing the data and an address within the bridge memory 142. This method is effective when the capacity of the bridge memory 142 is not large enough for the former method.

In this case, an address that is not converted by the address conversion processing module 121 is stored in the bridge memory 142. The DMA transfer processing module 144 then requests in Step 312 to read the data out of the host memory 107 and obtains in Step 313 the data read out of the host memory 107.

A detailed description will be given next with reference to FIGS. 4 to 6 on processing that is executed by the driver 103, the host-side bridge 120, and the DMA engine 143 during the data transfer processing shown in FIG. 3. Some steps of the processing shown in FIGS. 4 to 6 have already been described with reference to FIG. 3, and detailed descriptions thereof will be omitted here.

Figure 4:
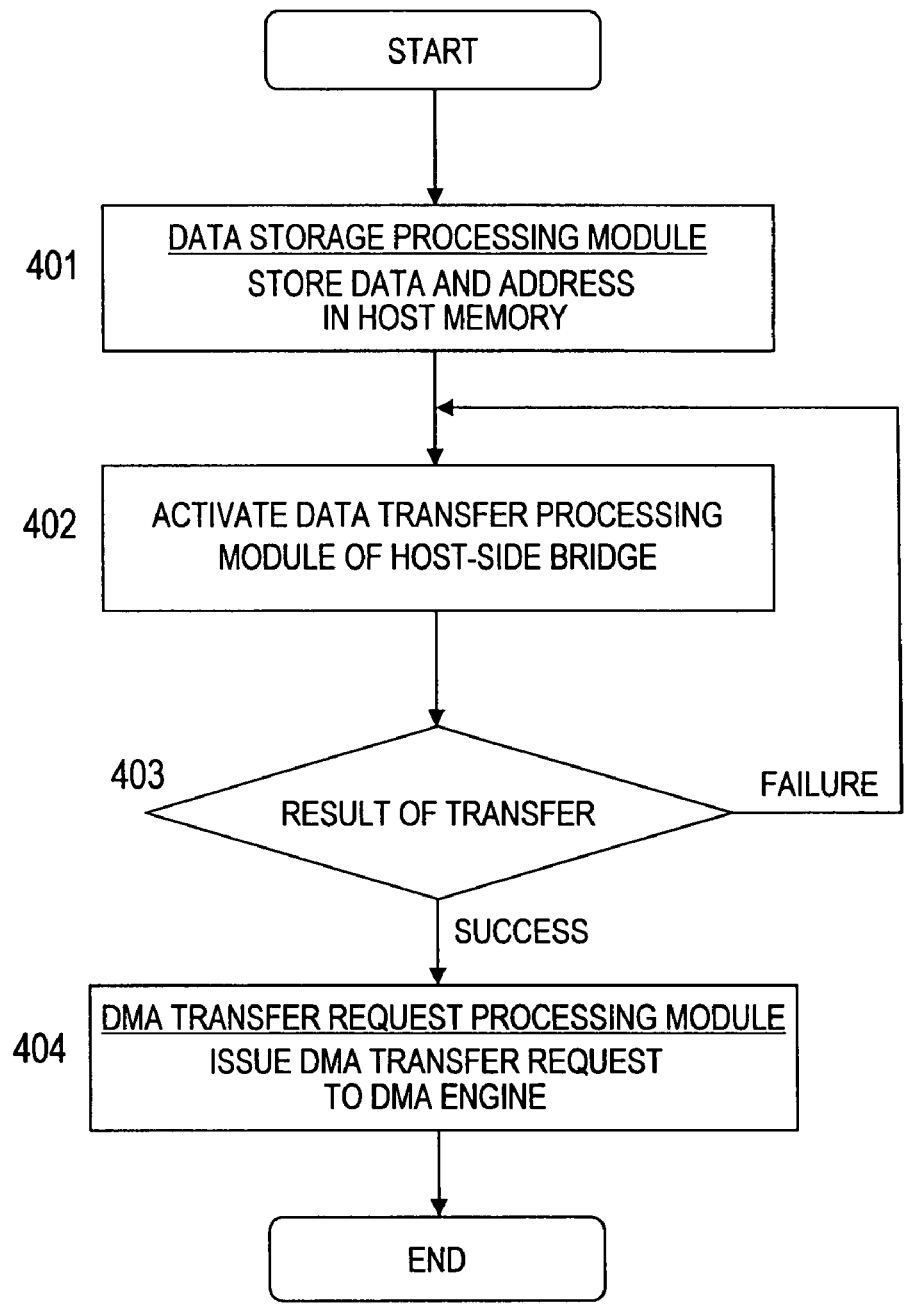
FIG. 4 is a flow chart showing processing that is executed by a driver according to the first embodiment of this invention.

FIG. 4 is a flow chart showing processing that is executed by the driver 103 according to the first embodiment of this invention.

First, the data storage processing module 105 of the driver 103 stores the requested data and address in the host memory 107 (Step 401). Step 401 corresponds to Steps 301 and 302 of FIG. 3.

Next, the driver 103 activates the data transfer processing module 123 of the host-side bridge 120 (Step 402). Step 402 corresponds to Step 303 of FIG. 3.

The driver 103 next judges whether data transfer by the data transfer processing module 123 has succeeded or not (Step 403). For example, the driver 103 may judge in Step 403 that the data transfer is a success when receiving the completion notification of Step 308 within a predetermined time period after the execution of Step 402, whereas the driver 103 may judge in Step 403 that the data transfer is a failure when not receiving the completion notification of Step 308 within the predetermined time period, or when receiving a transfer failure notification from the data transfer processing module 123.

In the case where the data transfer is judged as a "failure" in Step 403, the processing returns to Step 402 where the data transfer processing module 123 is activated again.

In the case where the data transfer is judged in Step 403 as a "success", on the other hand, the DMA transfer request processing module 106 of the driver 103 issues a DMA transfer request to the DMA engine 143 (Step 404). Step 404 corresponds to Step 309 of FIG. 3.

The driver 103 thus completes the processing.

Figure 5:
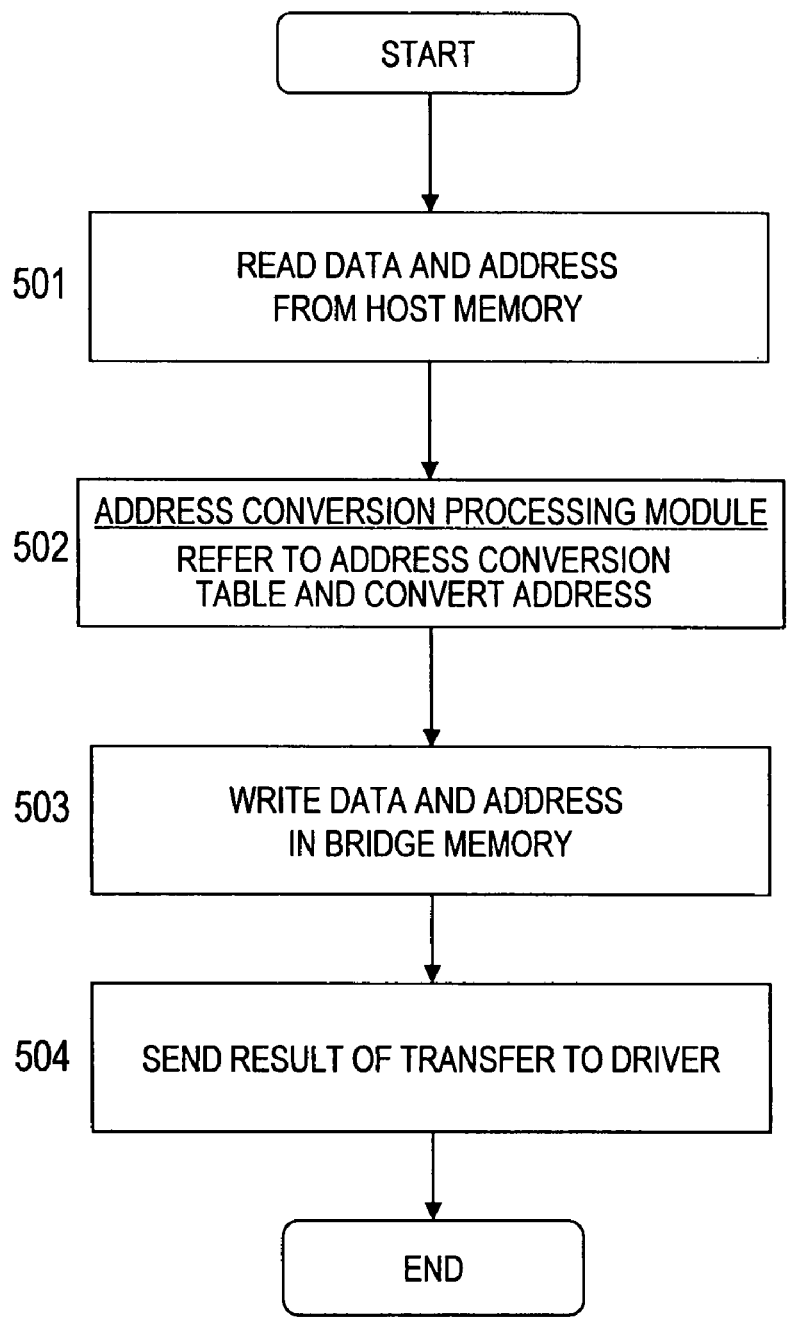
FIG. 5 is a flow chart showing processing that is executed by a host-side bridge according to the first embodiment of this invention.

FIG. 5 is a flow chart showing processing that is executed by the host-side bridge 120 according to the first embodiment of this invention.

Activated in Step 303 of FIG. 3, the data transfer processing module 123 of the host-side bridge 120 starts the processing shown in FIG. 5.

The data transfer processing module 123 of the host-side bridge 120 first reads the requested data and address from the host memory 107 (Step 501). Step 501 corresponds to Steps 304 and 305 of FIG. 3.

Next, the address conversion processing module 121 of the host-side bridge 120 refers to the address conversion table 122 and converts the read address (Step 502).

The data transfer processing module 123 writes in the bridge memory 124 the read data and the address obtained by the conversion in Step 502 (Step 503). Step 503 corresponds to Steps 306 and 307 of FIG. 3.

The data transfer processing module 123 then sends a data transfer result (that is, the result of the writing in Step 503) to the driver 103 (Step 504). Step 504 corresponds to Step 308 of FIG. 3.

The host-side bridge 120 thus completes the processing.

Figure 6:
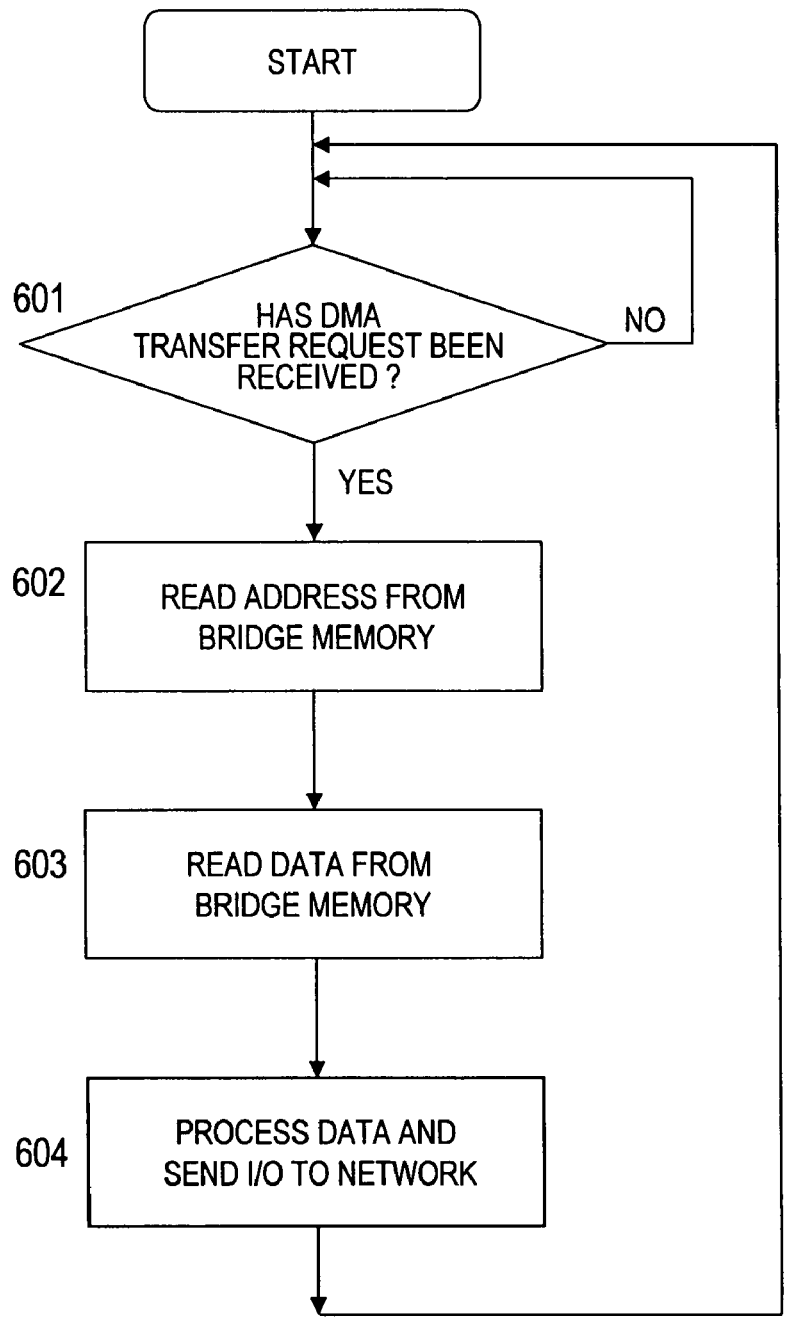
FIG. 6 is a flow chart showing processing that is executed by a DMA engine according to the first embodiment of this invention.

FIG. 6 is a flow chart showing processing that is executed by the DMA engine 143 according to the first embodiment of this invention.

First, the DMA transfer processing module 144 of the DMA engine 143 judges whether or not a DMA transfer request has been received (Step 601).

When it is judged in Step 601 that no DMA transfer request has been received, the DMA transfer processing module 144 waits for a DMA transfer request.

On the other hand, in the case where the DMA transfer request of Step 309 of FIG. 3 has been received, the DMA transfer processing module 144 judges in Step 601 that a DMA transfer request has been received. Then the DMA transfer processing module 144 reads the requested address from the bridge memory 142 (Step 602). Step 602 corresponds to Steps 310 and 311 of FIG. 3.

The DMA transfer processing module 144 next reads the requested data from the bridge memory 142 (Step 603). Step 603 corresponds to Steps 312 and 313 of FIG. 3.

The DMA transfer processing module 144 sends the data read in Step 603 to the device 170 via the network 160 (Step 604). Step 604 corresponds to Step 314 of FIG. 3.

The DMA engine 143 thus completes the processing.

A modification example of the first embodiment of this invention will be described next.

According to the first embodiment of this invention, the driver 103 of the host PC 100 issues DMA transfer requests as shown in FIG. 3 (Step 309). In the following modification example of the first embodiment, it is the host-side bridge that issues DMA transfer requests.

Figure 7:
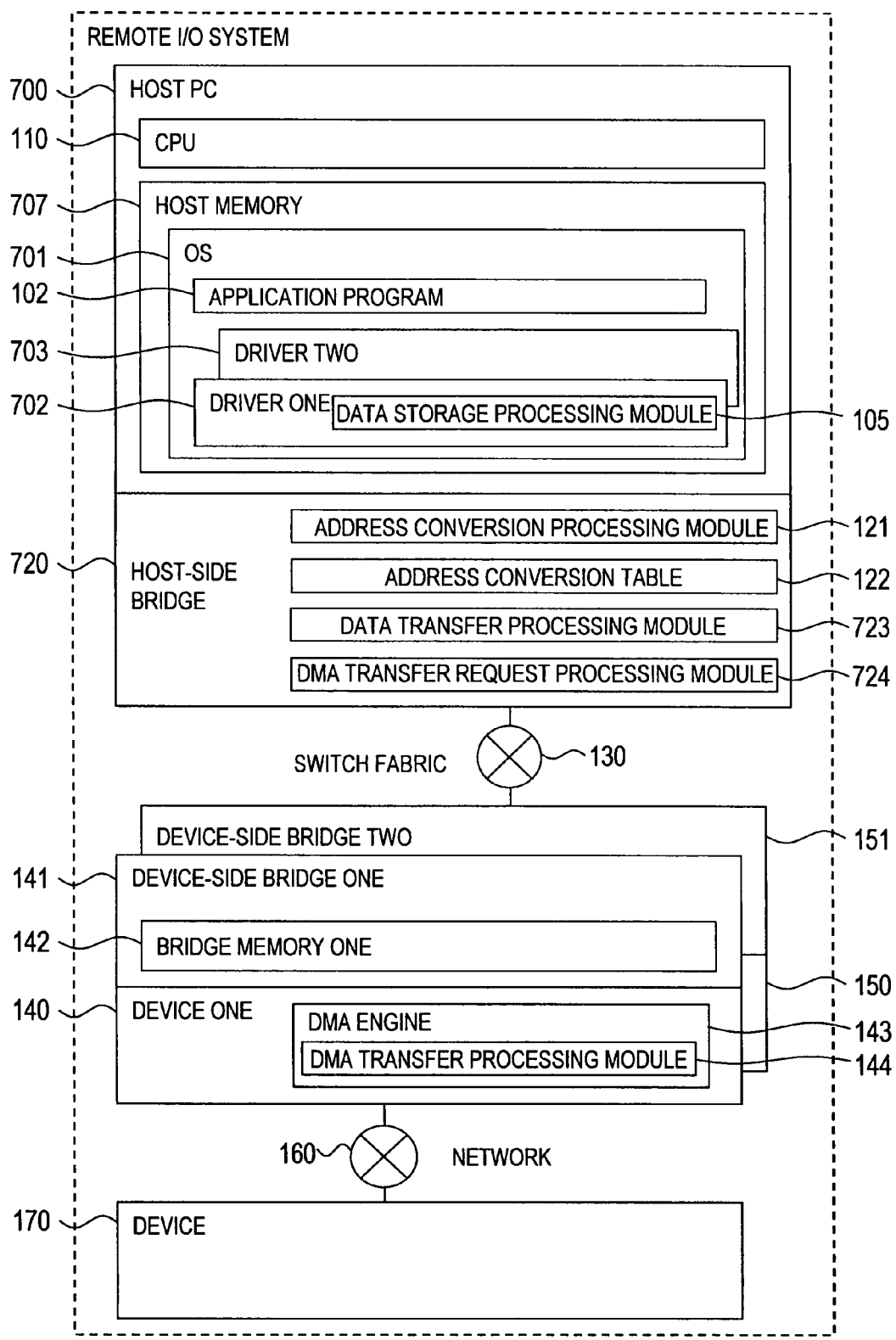
FIG. 7 is a block diagram of a remote I/O system according to a modification example of the first embodiment of this invention.

FIG. 7 is a block diagram of a remote I/O system according to the modification example of the first embodiment of this invention.

The remote I/O system shown in FIG. 7 is obtained by replacing the host PC 100 and the host-side bridge 120 of FIG. 1 with a host PC 700 and a host-side bridge 720, respectively. In FIG. 7, the CPU 110 and other components denoted by the same reference numerals that are used in FIG. 1 are identical with the components of FIG. 1. Descriptions on the components of the remote I/O system of FIG. 7 that are the same as the ones of FIG. 1 will be omitted here.

The host PC 700 is a computer that has at least the CPU 110 and a host memory 707.

The host memory 707 stores at least an OS 701, the application program 102, a driver 702, and a driver 703. The host memory 707 also stores temporary data including data that is to be transferred between the host PC 700 and the device 140 or other devices.

The drivers 702 and 703 are software executed to enable the OS 701 to control the devices 140 and 150. In FIG. 7, the driver 702 and the driver 703 are shown as "Driver One" and "Driver Two", respectively. The driver 702 in this modification example contains at least the data storage processing module 105. The driver 703 may contain a data storage processing module (not shown) like the driver 702 does.

The drivers 702 and 703 are executed by the CPU 110. Processing that is executed by the driver 702 or 703 in the following description is therefore actually executed by the CPU 110.

The host-side bridge 720 executes processing for connecting the host PC 700 to the switch fabric 130 (e.g., protocol conversion processing). The host-side bridge 720 shown in FIG. 7 contains at least the address conversion processing module 121, the address conversion table 122, a data transfer processing module 723, and a DMA transfer request processing module 724.

Figure 8:
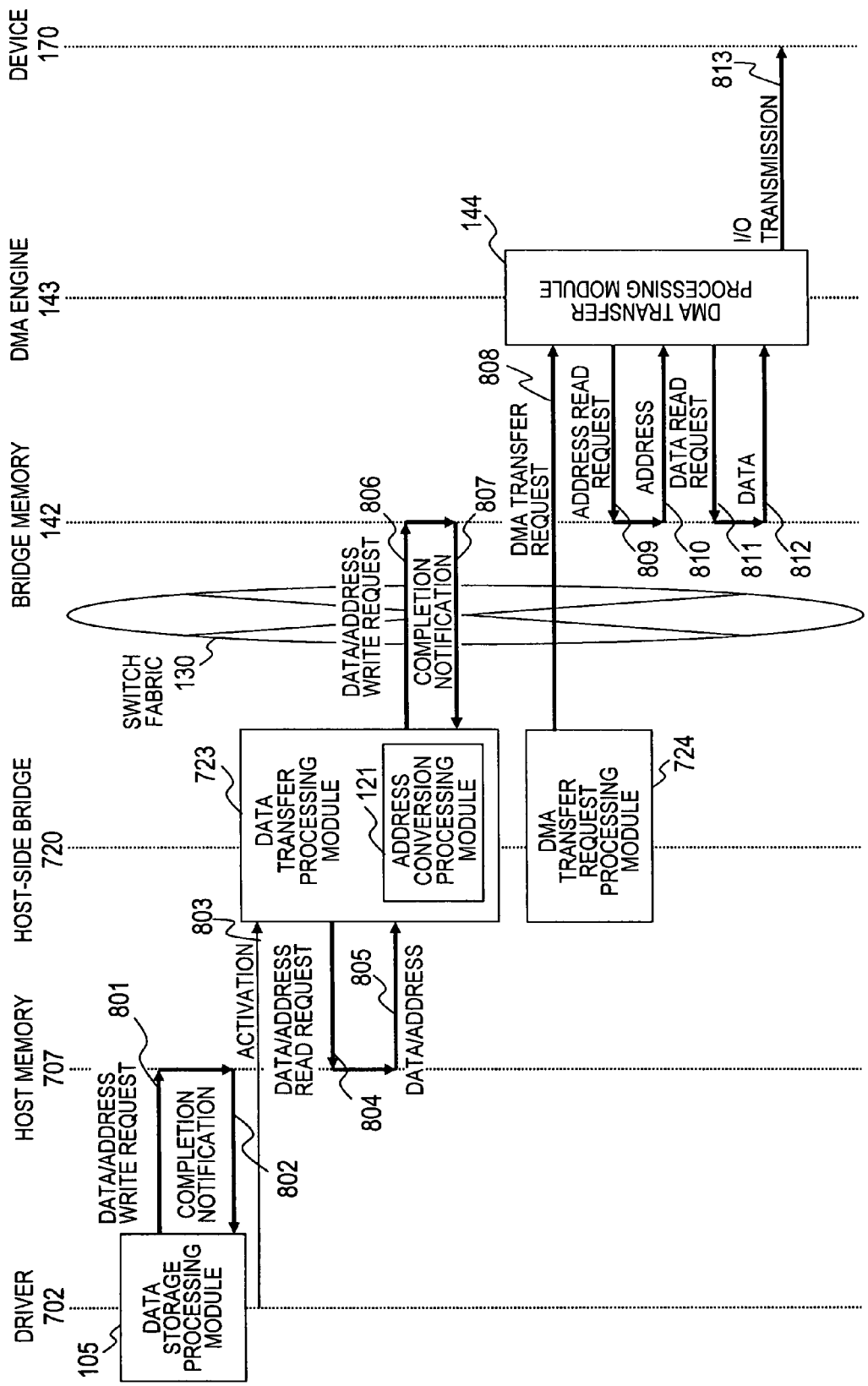
FIG. 8 is a sequence diagram showing data transfer processing that is executed in the remote I/O system according to the modification example of the first embodiment of this invention.

FIG. 8 is a sequence diagram showing data transfer processing that is executed in the remote I/O system according to the modification example of the first embodiment of this invention.

Specifically, FIG. 8 shows a series of processing steps executed to transfer data from the host PC 700 to the device 170. Some steps of the processing shown in FIG. 8 are similar to those shown in FIG. 3, and detailed descriptions thereof will be omitted here.

First, the data storage processing module 105 of the driver 702 issues a write request for storing in the host memory 707 data that is to be transferred and an address in the host memory 707 where this data is to be stored (Step 801). After the data and the address are stored as requested by the write request of Step 801, the driver 702 receives a completion notification (Step 802). Steps 801 and 802 are the same as Steps 301 and 302 of FIG. 3.

Next, the driver 702 activates the data transfer processing module 723 of the host-side bridge 720 (Step 803).

The data transfer processing module 723 of the host-side bridge 720 issues a read request directed to the host memory 707 (Step 804). As a result, the data to be transferred and the address in the host memory 707 at which the data is currently stored are read from the host memory 707 onto the host-side bridge 720 (Step 805). Steps 804 and 805 are the same as Steps 304 and 305 of FIG. 3.

Using the address conversion table 122, the address conversion processing module 121 of the host-side bridge 720 converts the address in the host memory 707 read in Step 805 into its associated address in the bridge memory 142 (see Step 1002 of FIG. 10 which will be described later). This address conversion is the same as the one described with reference to FIG. 3.

Next, the data transfer processing module 723 issues a write request for storing in the bridge memory 142 the data to be transferred (that is, the data read in Step 805) and the address obtained by the conversion in the address conversion processing module 121 (Step 806). After the data and address requested to be written in Step 806 are stored, the host-side bridge 720 receives a completion notification (Step 807). Steps 806 and 807 are the same as Steps 306 and 307 of FIG. 3.

When the host-side bridge 720 receives the completion notification of Step 807, the DMA transfer request processing module 724 sends a DMA transfer request to the DMA transfer processing module 144 of the DMA engine 143 (Step 808).

Receiving the DMA transfer request of Step 808, the DMA transfer processing module 144 issues an address read request to the bridge memory 142 (Step 809). As a result, an address stored in the bridge memory 142 is read (Step 810). The address read in Step 810 is the address that has been stored as requested by the write request of Step 806.

The DMA transfer processing module 144 next issues a data read request to the bridge memory 142 (Step 811). This read request is for data at the address read in Step 810. As a result, the data to be transferred is read from the bridge memory 142 at the address read in Step 810 (Step 812). The data read in Step 812 is the data that has been stored as requested by the write request of Step 806.

The DMA transfer processing module 144 then sends the data read in Step 812 to the device 170 (Step 813). Steps 809 to 813 are the same as Steps 310 to 314 of FIG. 3, respectively.

Data transfer from the host PC 700 to the device 170 is completed as above.

In Step 806, the data transfer processing module 723 requests to write in the bridge memory 142 the data to be transferred and an address in the bridge memory 142 at which the data is to be stored. However, the data transfer processing module 723 may request to write in the bridge memory 142 only an address in the host memory 707 at which the data to be transferred is currently stored instead of writing the data and an address within the bridge memory 142. This method is effective when the capacity of the bridge memory 142 is not large enough for the former method.

In this case, an address that is not converted by the address conversion processing module 121 is stored in the bridge memory 142. The DMA transfer processing module 144 then requests in Step 811 to read the data from the host memory 707 and obtains in Step 812 the data read out of the host memory 707.

A detailed description will be given next with reference to FIGS. 9 and 10 on processing that is executed by the driver 702 and the host-side bridge 720 during the data transfer processing shown in FIG. 8. Processing executed by the DMA engine 143 during the data transfer processing of FIG. 8 is as shown in FIG. 6, and the description will not be repeated. Some steps of the processing shown in FIGS. 9 and 10 have already been described with reference to other drawings, and detailed descriptions thereof will be omitted here.

Figure 9:
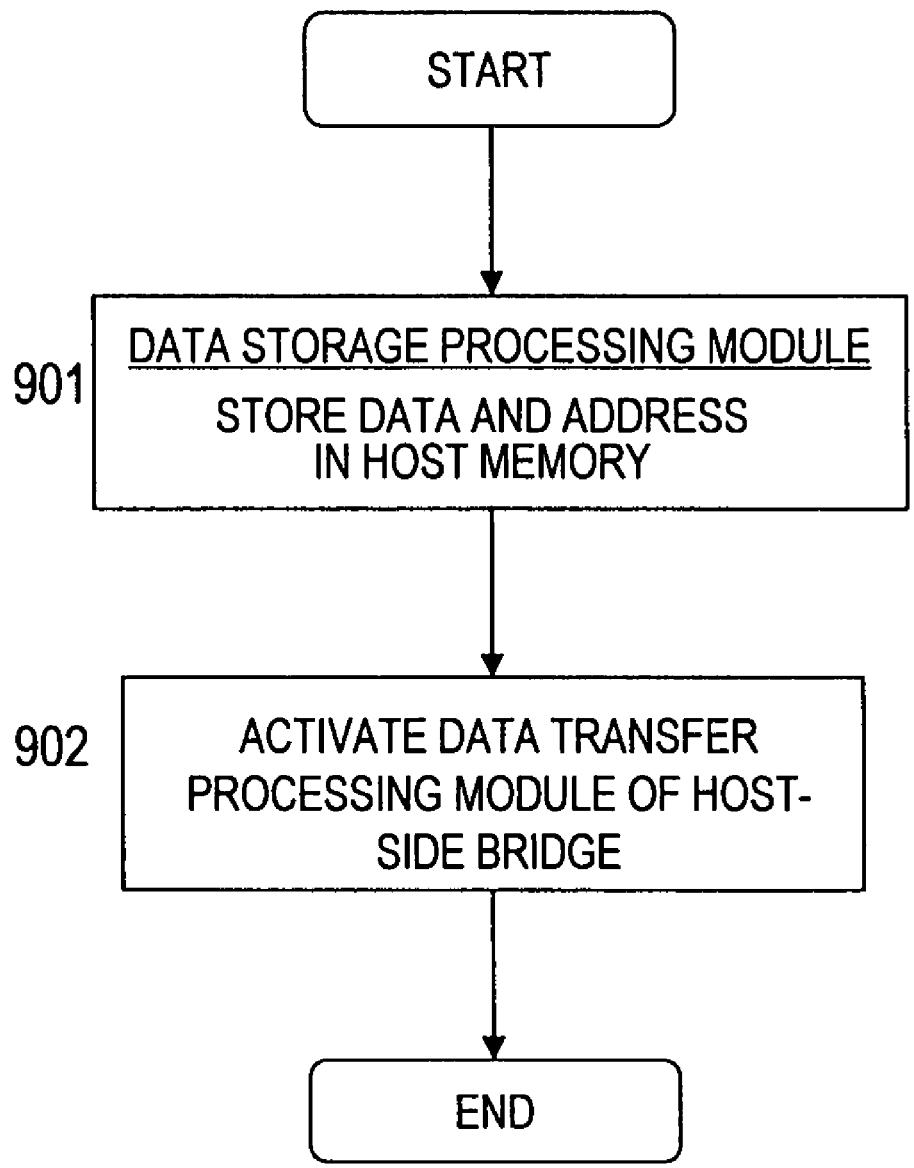
FIG. 9 is a flow chart showing processing that is executed by the driver according to the modification example of the first embodiment of this invention.

FIG. 9 is a flow chart showing processing that is executed by the driver 702 according to the modification example of the first embodiment of this invention.

First, the data storage processing module 105 of the driver 702 stores the requested data and address in the host memory 707 (Step 901). Step 901 corresponds to Steps 801 and 802 of FIG. 8.

Next, the driver 702 activates the data transfer processing module 723 of the host-side bridge 720 (Step 902). Step 902 corresponds to Step 803 of FIG. 8.

The driver 702 thus completes the processing.

Figure 10:
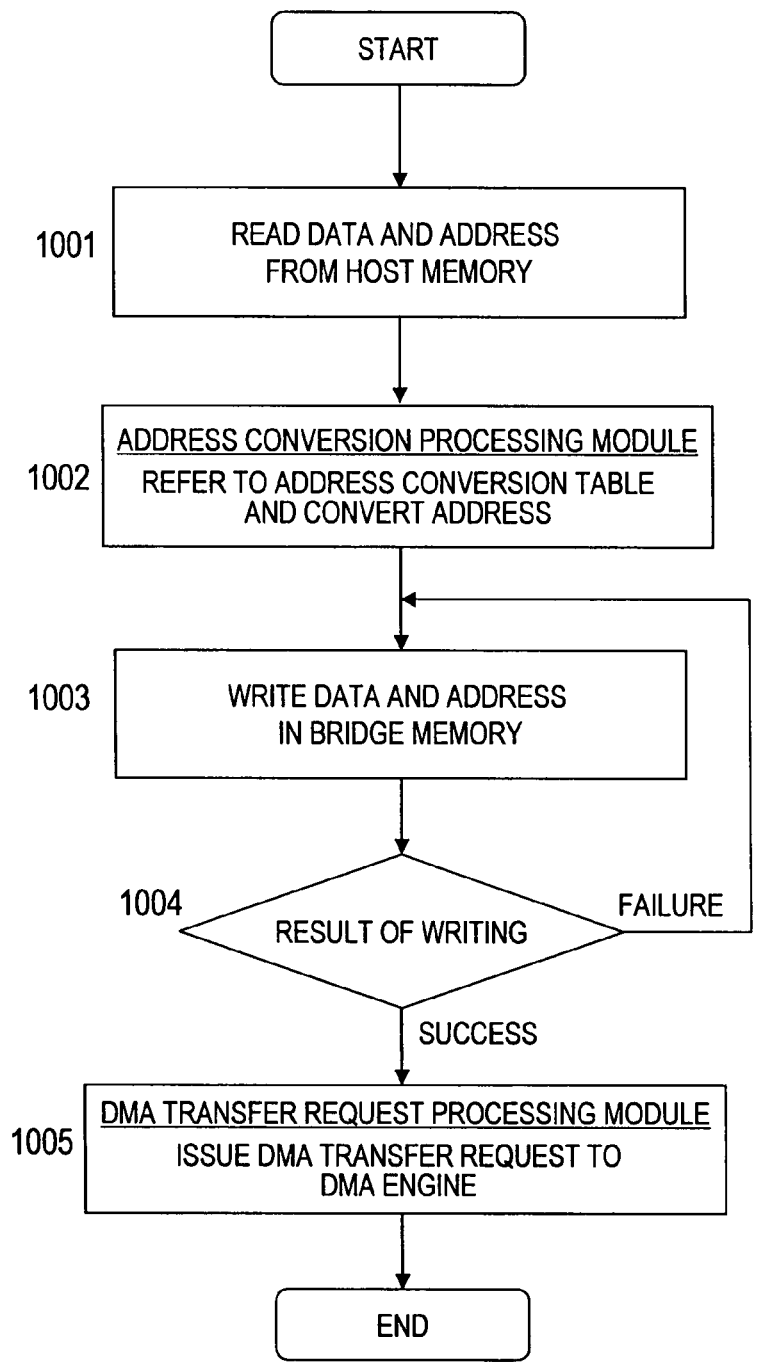
FIG. 10 is a flow chart showing processing that is executed by the host-side bridge according to the modification example of the first embodiment of this invention.

FIG. 10 is a flow chart showing processing that is executed by the host-side bridge 720 according to the modification example of the first embodiment of this invention.

Activated in Step 803 of FIG. 8, the data transfer processing module 723 of the host-side bridge 720 starts the processing shown in FIG. 10.

The data transfer processing module 723 of the host-side bridge 720 first reads the requested data and address from the host memory 707 (Step 1001). Step 1001 corresponds to Steps 804 and 805 of FIG. 8.

Next, the address conversion processing module 121 of the host-side bridge 720 refers to the address conversion table 122 and converts the read address (Step 1002).

The data transfer processing module 723 writes in the bridge memory 142 the read data and the address obtained by the conversion in Step 1002 (Step 1003). Step 1003 corresponds to Step 806 of FIG. 8.

Next, the data transfer processing module 723 judges whether the writing in Step 1003 has succeeded or not (Step 1004). For example, the data transfer processing module 723 may judge in Step 1004 that the writing is a "success" when receiving the completion notification of Step 807 within a predetermined time period after the execution of Step 1003, whereas the data transfer processing module 723 may judge in Step 1004 that the writing is a "failure" when not receiving the completion notification of Step 807 within the predetermined time period, or when receiving a write failure notification.

In the case where the writing is judged as a "failure" in Step 1004, the processing returns to Step 1003 where writing of the data and the address is executed again.

In the case where the writing is judged in Step 1004 as a "success", on the other hand, the DMA transfer request processing module 724 of the host-side bridge 720 issues a DMA transfer request to the DMA engine 143 (Step 1005). Step 1005 corresponds to Step 808 of FIG. 8.

The host-side bridge 720 thus completes the processing.

A second embodiment of this invention will be described next.

Figure 11:
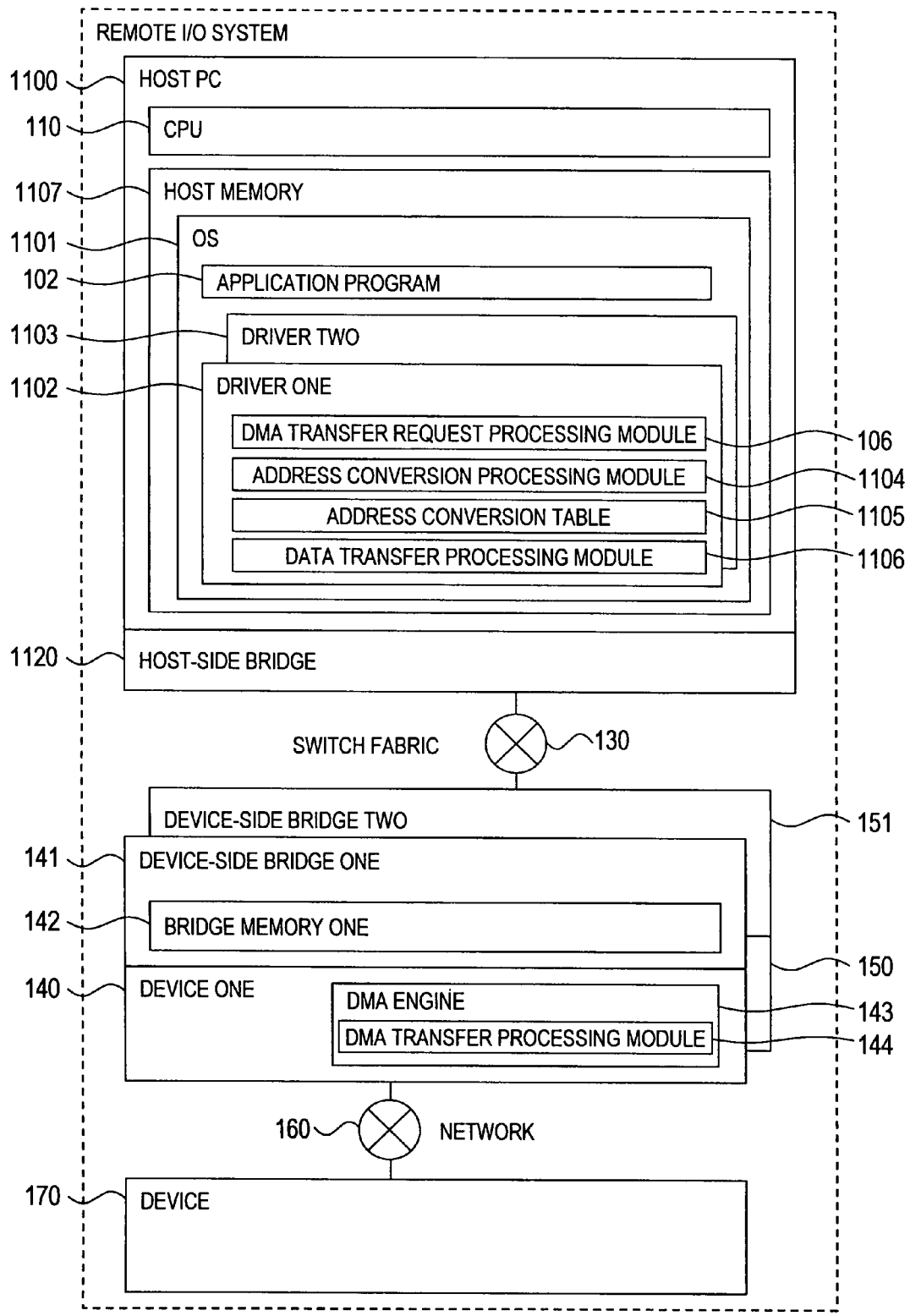
FIG. 11 is a block diagram of a remote I/O system according to a second embodiment of this invention.

FIG. 11 is a block diagram of a remote I/O system according to the second embodiment of this invention.

The remote I/O system shown in FIG. 11 is obtained by replacing the host PC 100 and the host-side bridge 120 of FIG. 1 with a host PC 1100 and a host-side bridge 1120, respectively. In FIG. 11, the CPU 110 and other components denoted by the same reference numerals that are used in FIG. 1 are identical with the components of FIG. 1. Descriptions on the components of the remote I/O system of FIG. 11 that are the same as the ones of FIG. 1 will be omitted here.

The host PC 1100 is a computer that comprises at least the CPU 110 and a host memory 1107.

The host memory 1107 stores at least an OS 1101, the application program 102, a driver 1102, and a driver 1103. The host memory 1107 also stores temporary data including data that is to be transferred between the host PC 1100 and the device 140 or other devices.

The drivers 1102 and 1103 are software executed to enable the OS 1101 to control the devices 140 and 150. In FIG. 11, the driver 1102 and the driver 1103 are shown as "Driver One" and "Driver Two", respectively. The driver 1102 in this embodiment contains at least the DMA transfer request processing module 106, an address conversion processing module 1104, an address conversion table 1105, and a data transfer processing module 1106. The driver 1103 may contain a DMA transfer request processing module (not shown), an address conversion processing module (not shown), an address conversion table (not shown), and a data transfer processing module (not shown) like the driver 1102 does.

The address conversion table 1105 is the same as the address conversion table 122 shown in FIG. 2, and a description thereof will be omitted here. Processing executed by the respective processing modules inside the driver 1102 will be described later with reference to FIGS. 12 and 13.

The drivers 1102 and 1103 are executed by the CPU 110. Processing that is executed by the driver 1102 or 1103 in the following description is therefore actually executed by the CPU 110.

The host-side bridge 1120 executes processing for connecting the host PC 1100 to the switch fabric 130 (e.g., protocol conversion processing).

Figure 12:
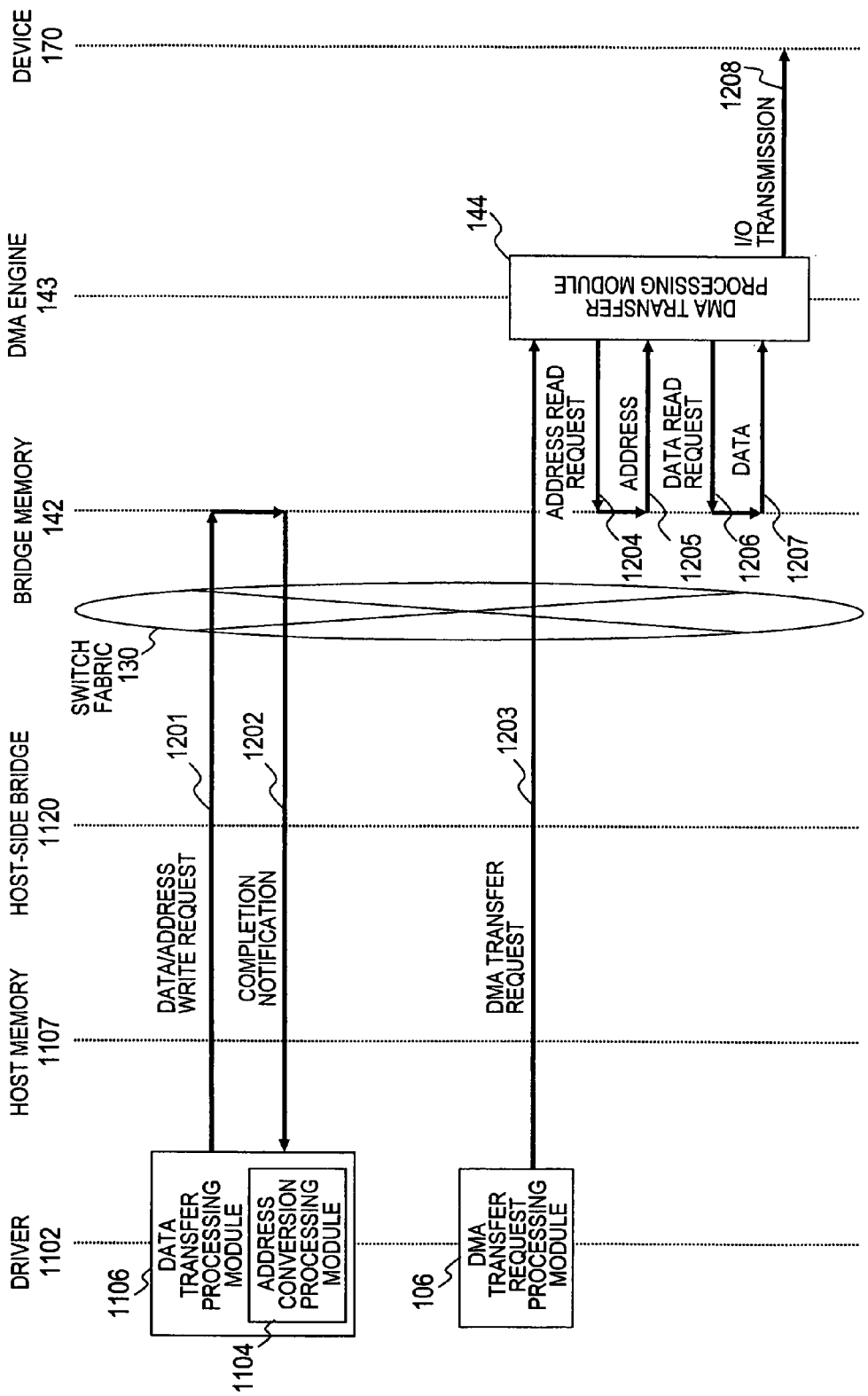
FIG. 12 is a sequence diagram showing data transfer processing that is executed in the remote I/O system according to the second embodiment of this invention.

FIG. 12 is a sequence diagram showing data transfer processing that is executed in the remote I/O system according to the second embodiment of this invention.

Specifically, FIG. 12 shows a series of processing steps executed to transfer data from the host PC 1100 to the device 170. Some steps of the processing shown in FIG. 12 are similar to those shown in FIG. 3, and detailed descriptions thereof will be omitted here.

First, the address conversion processing module 1104 of the driver 1102 refers to the address conversion table 1105 and converts an address in the host memory 1107 at which data to be transferred is currently stored into an address within the bridge memory 142.

Next, the data transfer processing module 1106 of the driver 1102 issues a write request for storing in the bridge memory 142 the data to be transferred and the address obtained by the conversion (Step 1201). As a result, the data to be transferred is stored in the bridge memory 142 at the address obtained by the conversion in the address conversion processing module 1104. The value of the address at which the data is now stored is also stored in the bridge memory 142 at another address. After the data and the address are stored as requested by the write request of Step 1201, the driver 1102 receives a completion notification (Step 1202).

When the driver 1102 receives the completion notification of Step 1202, the DMA transfer request processing module 106 sends a DMA transfer request to the DMA transfer processing module 144 of the DMA engine 143 (Step 1203). Step 1203 is the same as Step 309 of FIG. 3.

Receiving the DMA transfer request of Step 1203, the DMA transfer processing module 144 issues an address read request to the bridge memory 142 (Step 1204). As a result, an address stored in the bridge memory 142 is read (Step 1205). The address read in Step 1205 is the address that has been stored as requested by the write request of Step 1201.

The DMA transfer processing module 144 next issues a data read request to the bridge memory 142 (Step 1206). This read request is for data at the address read in Step 1205. As a result, the data to be transferred is read from the bridge memory 142 at the address read in Step 1205 (Step 1207). The data read in Step 1207 is the data that has been stored as requested by the write request of Step 1201.

The DMA transfer processing module 144 then sends the data read in Step 1207 to the device 170 (Step 1208). Steps 1204 to 1208 are the same as Steps 310 to 314 of FIG. 3, respectively.

Data transfer from the host PC 1100 to the device 170 is completed as above.

In Step 1201, the data transfer processing module 1106 requests to write in the bridge memory 142 the data to be transferred and an address in the bridge memory 142 at which the data is to be stored. However, in Step 1201 the data transfer processing module 1106 may request to write in the bridge memory 142 only an address in the host memory 1107 at which the data to be transferred is currently stored instead of writing the data and an address within the bridge memory 142. This method is effective when the capacity of the bridge memory 142 is not large enough for the former method.

In this case, an address that is not converted by the address conversion processing module 1104 is stored in the bridge memory 142. The DMA transfer processing module 144 then requests in Step 1206 to read the data out of the host memory 1107 and obtains in Step 1207 the data read from the host memory 1107.

Alternatively, the data transfer processing module 1106 may request in Step 1201 to write in the bridge memory 142 only the data to be transferred instead of writing the data and an address within the bridge memory 142.

In this case, the data to be transferred is stored in an area of the bridge memory 142 that is indicated by the address obtained by the conversion in the address conversion processing module 1104. Also, the address in the bridge memory 142 at which the data to be transferred is now stored (i.e., the address obtained by the conversion in the address conversion processing module 1104) is stored in the host memory 1107. The DMA transfer processing module 144 then requests in Step 1204 to read the address from the host memory 1107 and obtains in Step 1205 the address read from the host memory 1107.

In Step 1206, the DMA transfer processing module 144 issues a data read request for data at the address obtained in Step 1205. As a result, the data to be transferred is read from the bridge memory 142 in Step 1207.

A description will be given next with reference to FIG. 13 on processing that is executed by the driver 1102 during the data transfer processing shown in FIG. 12. Processing executed by the DMA engine 143 during the data transfer processing of FIG. 12 is as shown in FIG. 6, and the description will not be repeated. Some steps of the processing shown in FIG. 13 have already been described with reference to other drawings, and detailed descriptions thereof will be omitted here.

Figure 13:
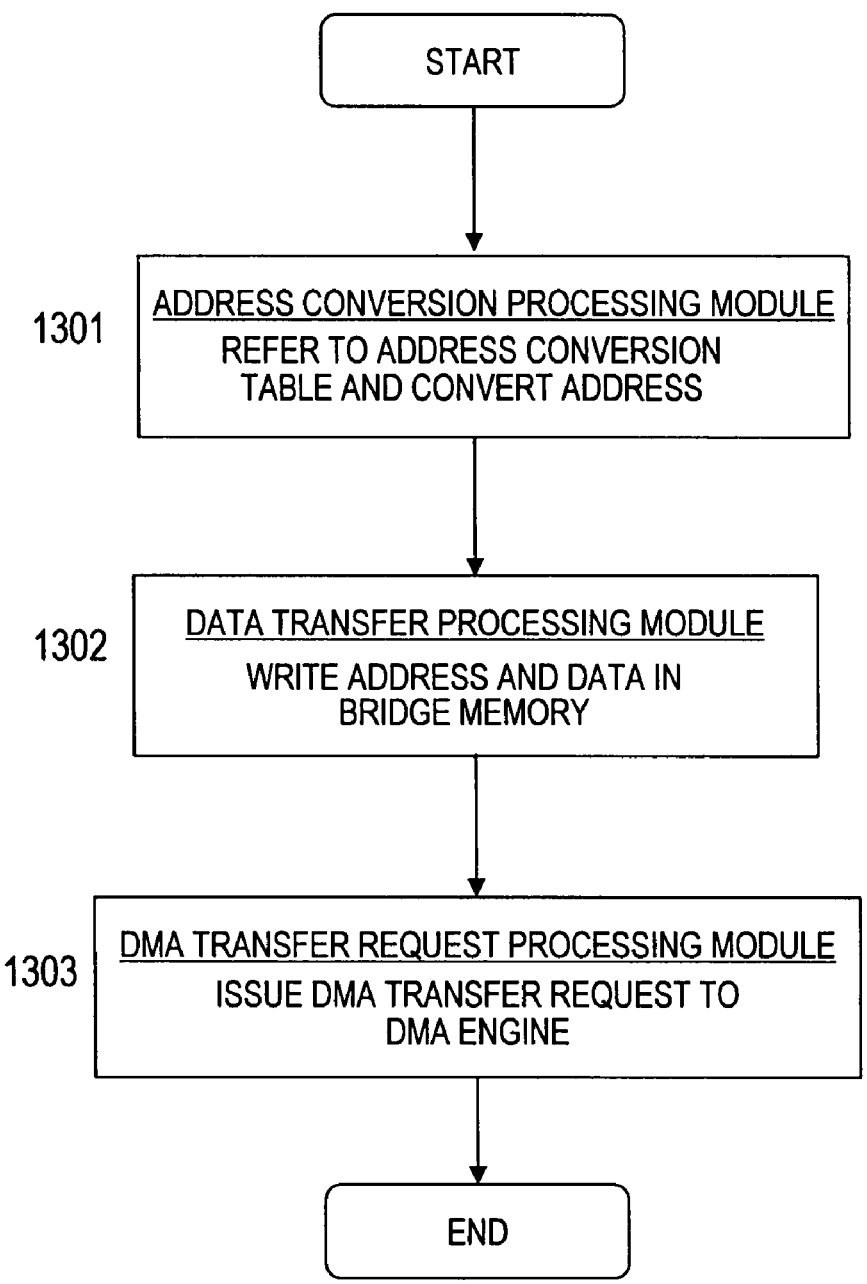
FIG. 13 is a flow chart showing processing that is executed by the driver according to the second embodiment of this invention.

FIG. 13 is a flow chart showing processing that is executed by the driver 1102 according to the second embodiment of this invention.

First, the address conversion processing module 1104 of the driver 1102 refers to the address conversion table 1105 and converts the address in the host memory 1107 at which the data to be transferred is currently stored into an address within the bridge memory 142 (Step 1301).

Next, the data transfer processing module 1106 of the driver 1102 writes the data and the address obtained by the conversion in the bridge memory 142 (Step 1302). Step 1302 corresponds to Steps 1201 and 1202 of FIG. 12.

The DMA transfer request processing module 106 of the driver 1102 issues a DMA transfer request to the DMA engine 143 (Step 1303). Step 1303 corresponds to Step 1203 of FIG. 12.

The driver 1102 thus completes the processing.

A third embodiment of this invention will be described next.

Figure 14:
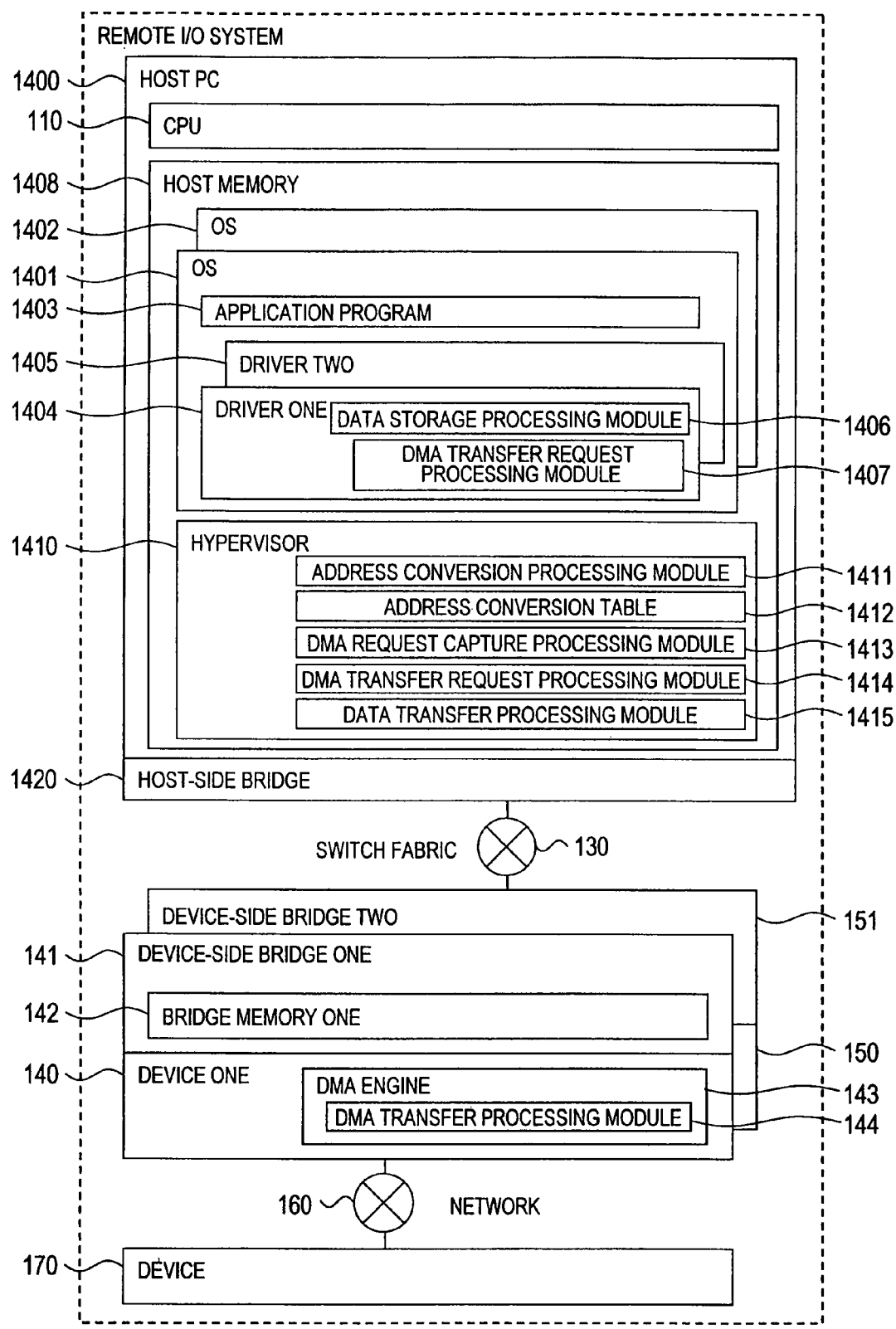
FIG. 14 is a block diagram of a remote I/O system according to a third embodiment of this invention.

FIG. 14 is a block diagram of a remote I/O system according to the third embodiment of this invention.

The remote I/O system shown in FIG. 14 is obtained by replacing the host PC 100 and the host-side bridge 120 of FIG. 1 with a host PC 1400 and a host-side bridge 1420, respectively. In FIG. 14, the CPU 110 and other components denoted by the same reference numerals that are used in FIG. 1 are identical with the components of FIG. 1. Descriptions on the components of the remote I/O system of FIG. 14 that are the same as the ones of FIG. 1 will be omitted here.

The host PC 1400 is a computer that has at least the CPU 110 and a host memory 1408.

The host memory 1408 stores at least an OS 1401, an OS 1402, an application program 1403, a driver 1404, a driver 1405, and a hypervisor 1410. The host memory 1408 also stores temporary data including data that is to be transferred between the host PC 1400 and the device 140 or other devices.

The hypervisor 1410 is software that executes processing for virtualizing resources of the host PC 1400. The hypervisor 1410 enables multiple OSs, here, the OSs 1401 and 1402, to run on the single CPU 110. Although FIG. 14 shows two OSs 1401 and 1402, the host memory 1408 of this embodiment can store an arbitrary number of OSs running on the single CPU 110. The OS 1401 alone is mentioned in the following description, but the OS 1402 can have the same configuration and execute the same processing as the OS 1401.

FIG. 14 shows a case in which the hypervisor 1410 is used to virtualize resources of the host PC 1400. However, this embodiment can employ other virtualization measures than the hypervisor 1410.

The drivers 1404 and 1405 are software executed to enable the OS 1401 to control the devices 140 and 150. In FIG. 14, the driver 1404 and the driver 1405 are shown as "Driver One" and "Driver Two", respectively. The driver 1404 in this embodiment contains at least a data storage processing module 1406 and a DMA transfer request processing module 1407. The driver 1405 may contain a data storage processing module (not shown) and a DMA transfer request processing module (not shown) like the driver 1404 does.

The hypervisor 1410 contains at least an address conversion processing module 1411, an address conversion table 1412, a DMA request capture processing module 1413, a DMA transfer request processing module 1414, and a data transfer processing module 1415.

The hypervisor 1410 is software executed by the CPU 110. Processing that is executed by the respective processing modules within the hypervisor 1410 in the following description is therefore actually executed by the CPU 110.

The host-side bridge 1420 executes processing for connecting the host PC 1400 to the switch fabric 130 (e.g., protocol conversion processing).

Figure 15:
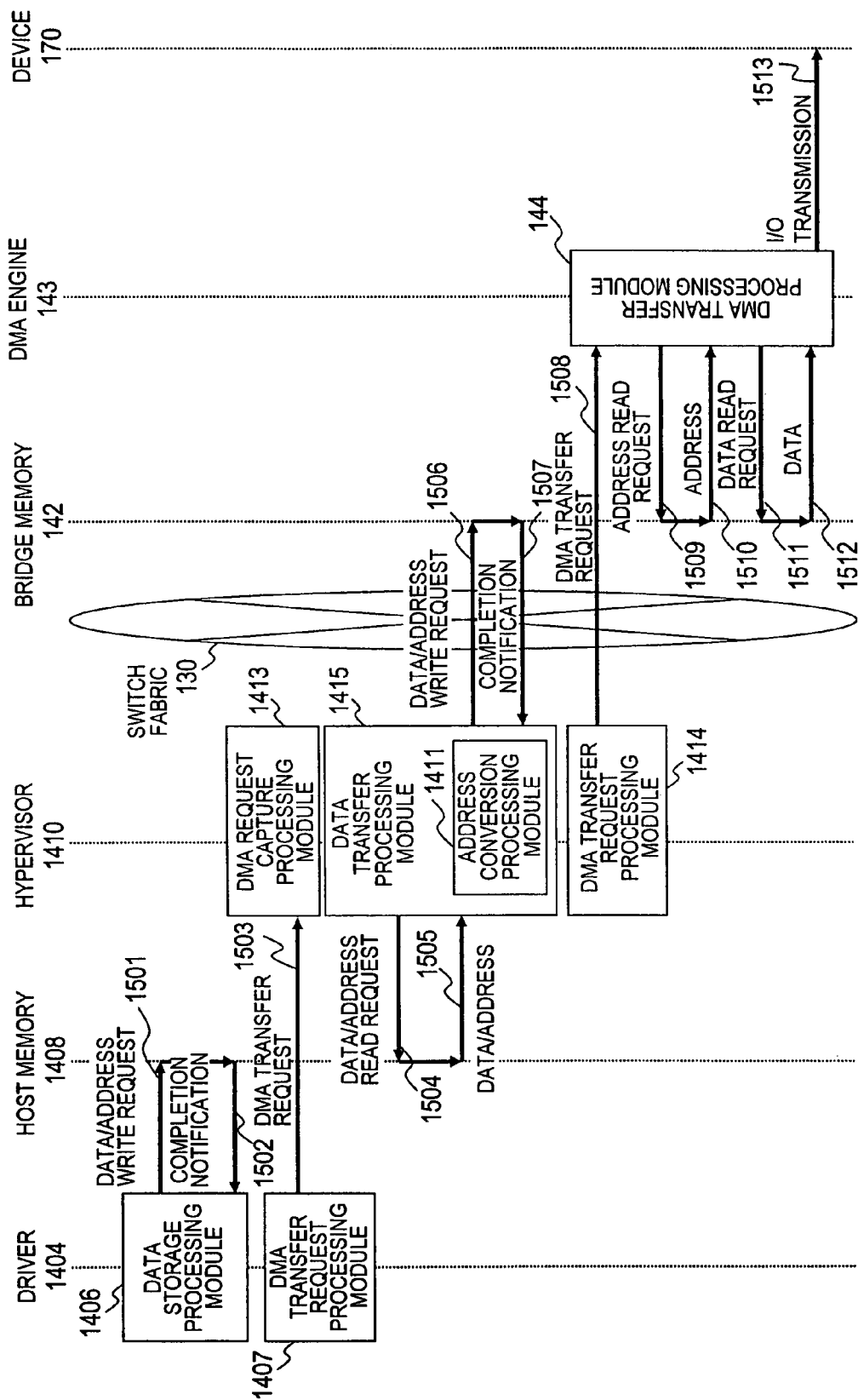
FIG. 15 is a sequence diagram showing data transfer processing that is executed in the remote I/O system according to the third embodiment of this invention.

FIG. 15 is a sequence diagram showing data transfer processing that is executed in the remote I/O system according to the third embodiment of this invention.

Specifically, FIG. 15 shows a series of processing steps executed to transfer data from the host PC 1400 to the device 170. Some steps of the processing shown in FIG. 15 are similar to those shown in FIG. 3 and other drawings, and detailed descriptions thereof will be omitted here.

First, the data storage processing module 1406 of the driver 1404 issues a write request for storing in the host memory 1408 data that is to be transferred and an address in the host memory 1408 where this data is to be stored (Step 1501). After the data and the address are stored as requested by the write request of Step 1501, the driver 1404 receives a completion notification (Step 1502). Steps 1501 and 1502 are the same as Steps 301 and 302 of FIG. 3.

When the driver 1404 receives the completion notification of Step 1502, the DMA transfer request processing module 1407 sends a DMA transfer request to the DMA transfer processing module 144 of the DMA engine 143 (Step 1503). Step 1503 is the same as Step 309 of FIG. 3.

The DMA transfer request of Step 1503 which is sent to the DMA engine 143 is captured by the DMA request capture processing module 1413 of the hypervisor 1410 (Step 1513).

The data transfer processing module 1415 of the hypervisor 1410 issues a read request directed to the host memory 1408 according to the DMA transfer request captured by the DMA request capture processing module 1413 (Step 1504). As a result, the data to be transferred and the address in the host memory 1408 at which the data is currently stored are read from the host memory 1408 onto the hypervisor 1410 (Step 1505). The processing executed in Steps 1504 and 1505 is the same as the one executed in Steps 304 and 305 of FIG. 3 by the data transfer processing module 123 of the host-side bridge 120.

Using the address conversion table 1412, the address conversion processing module 1411 of the hypervisor 1410 converts the address in the host memory 1408 read in Step 1505 into its associated address in the bridge memory 142 (see Step 1703 of FIG. 17 which will be described later). This address conversion is the same as the one described with reference to FIG. 3.

Next, the data transfer processing module 1415 issues a write request for storing in the bridge memory 142 the data to be transferred (the data read in Step 1505) and the address obtained by the conversion in the address conversion processing module 1411 (Step 1506). After the data and address requested to be written in Step 1506 are stored, the hypervisor 1410 receives a completion notification (Step 1507). The processing executed in Steps 1506 and 1507 is the same as the one executed in Steps 306 and 307 of FIG. 3 by the data transfer processing module 123 of the host-side bridge 120.

When the hypervisor 1410 receives the completion notification of Step 1507, the DMA transfer request processing module 1414 of the hypervisor 1410 sends a DMA transfer request to the DMA transfer processing module 144 of the DMA engine 143 (Step 1508).

Receiving the DMA transfer request of Step 1508, the DMA transfer processing module 144 issues an address read request to the bridge memory 142 (Step 1509). As a result, an address stored in the bridge memory 142 is read (Step 1510). The address read in Step 1510 is the address that has been stored as requested by the write request of Step 1506.

The DMA transfer processing module 144 next issues a data read request to the bridge memory 142 (Step 1511). This read request is for data at the address read in Step 1510. As a result, the data to be transferred is read from the bridge memory 142 at the address read in Step 1510 (Step 1512). The data read in Step 1512 is the data that has been stored as requested by the write request of Step 1506.

The DMA transfer processing module 144 then sends the data read in Step 1512 to the device 170 (Step 1513). Steps 1509 to 1513 are the same as Steps 310 to 314 of FIG. 3, respectively.

Data transfer from the host PC 1400 to the device 170 is completed as above.

In Step 1506 described above, the data transfer processing module 1415 requests to write in the bridge memory 142 the data to be transferred and an address in the bridge memory 142 at which the data is to be stored. The data transfer processing module 1415 may request to write in the bridge memory 142 only an address in the host memory 1408 at which the data to be transferred is currently stored instead of writing the data and an address within the bridge memory 142 as described above. This method is effective when the capacity of the bridge memory 142 is not large enough for the former method.

In this case, an address that is not converted by the address conversion processing module 1411 is stored in the bridge memory 142. The DMA transfer processing module 144 then requests in Step 1511 to read the data from the host memory 1408 and obtains in Step 1512 the data read from the host memory 1408.

A detailed description will be given next with reference to FIGS. 16 and 17 on processing that is executed by the driver 1404 and the hypervisor 1410 during the data transfer processing shown in FIG. 15. Processing executed by the DMA engine 143 during the data transfer processing of FIG. 15 is as shown in FIG. 6, and the description will not be repeated. Some steps of the processing shown in FIGS. 16 and 17 have already been described with reference to other drawings, and detailed descriptions thereof will be omitted here.

Figure 16:
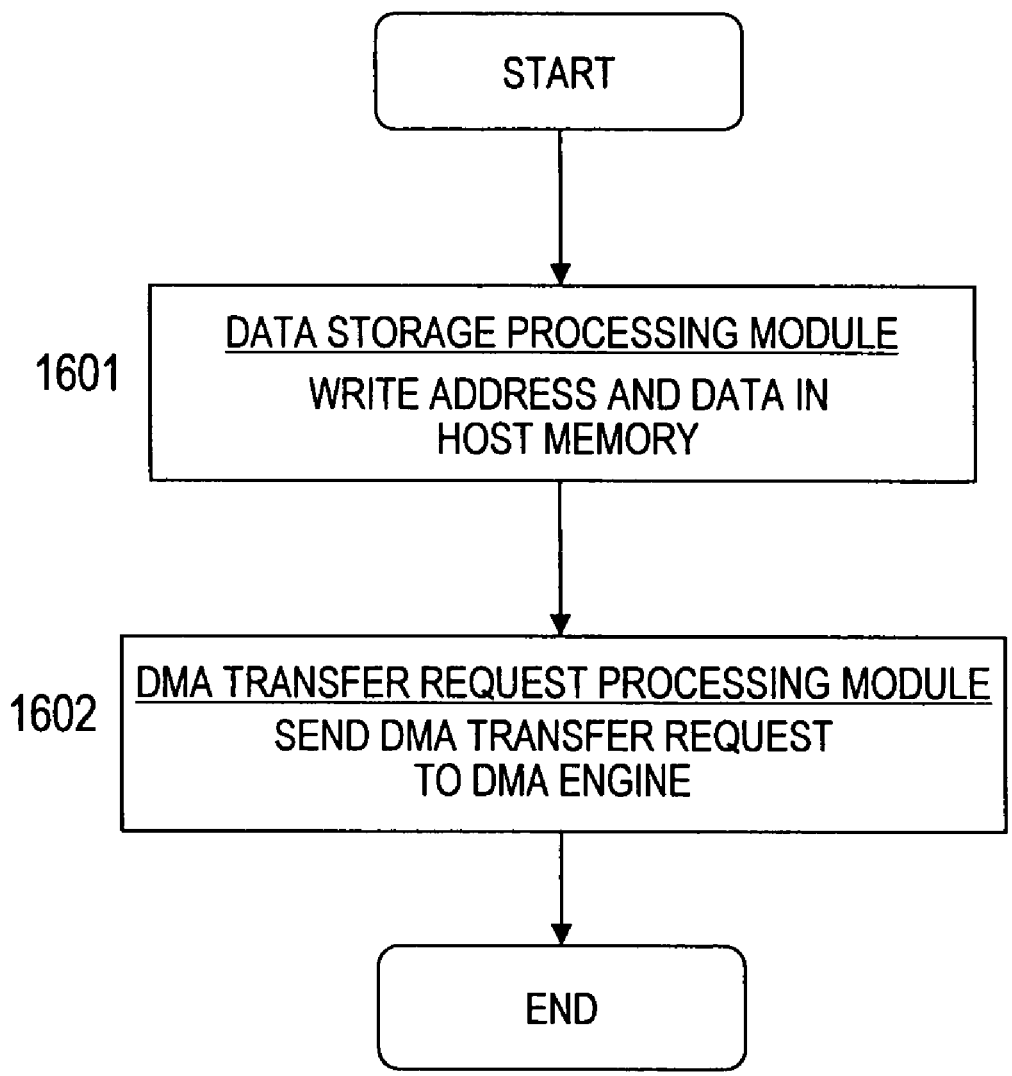
FIG. 16 is a flow chart showing processing that is executed by the driver according to the third embodiment of this invention.

FIG. 16 is a flow chart showing processing that is executed by the driver 1404 according to the third embodiment of this invention.

First, the data storage processing module 1406 of the driver 1404 stores the requested data and address in the host memory 1408 (Step 1601). Step 1601 corresponds to Steps 1501 and 1502 of FIG. 15.

Next, the DMA transfer request processing module 1407 of the driver 1404 sends a DMA transfer request to the DMA engine 143 (Step 1602). Step 1602 corresponds to Step 1503 of FIG. 15.

The driver 1404 thus completes the processing.

Figure 17:
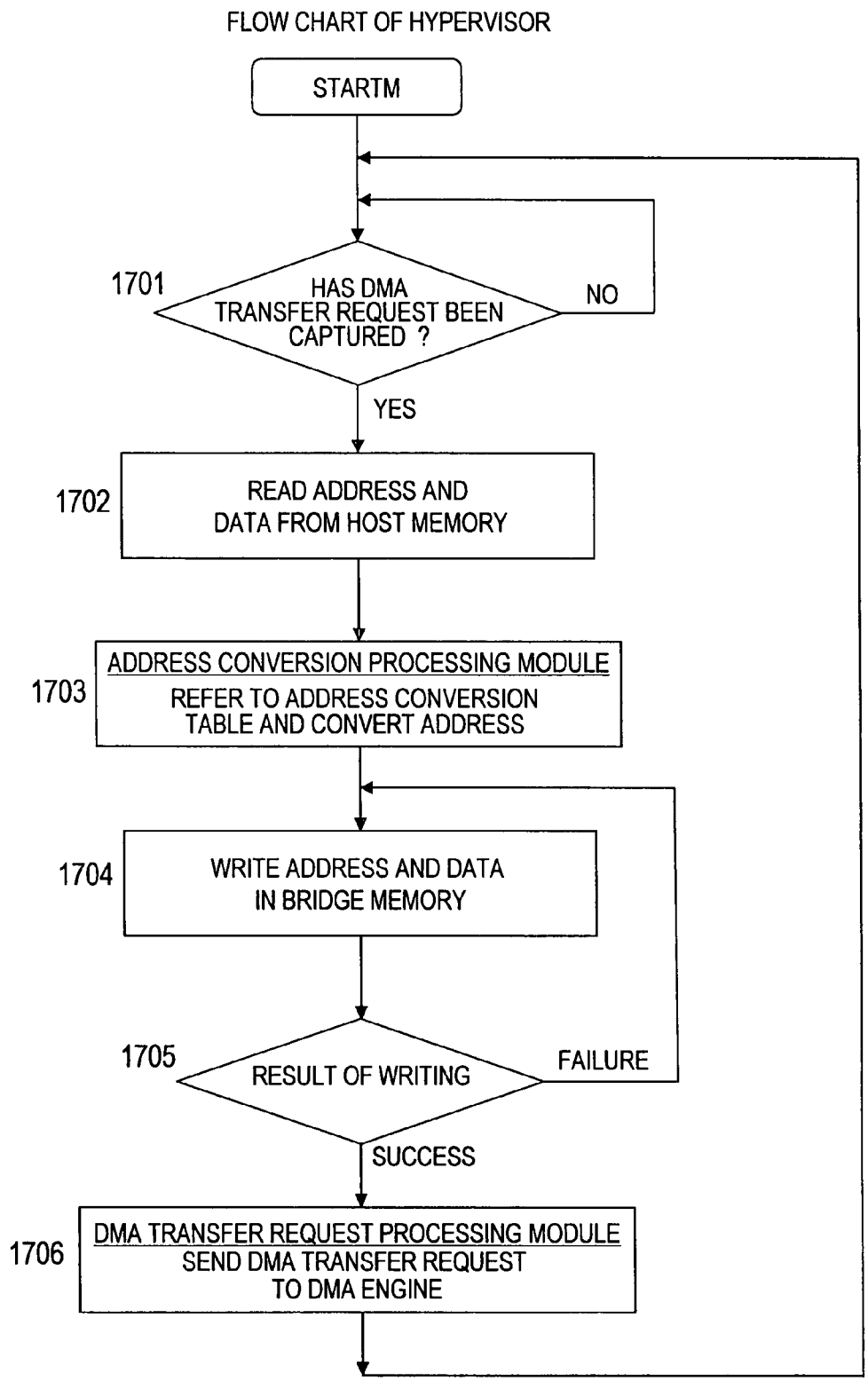
FIG. 17 is a flow chart showing processing that is executed by a hypervisor according to the third embodiment of this invention.

FIG. 17 is a flow chart showing processing that is executed by the hypervisor 1410 according to the third embodiment of this invention.

First, the DMA request capture processing module 1413 of the hypervisor 1410 judges whether or not a DMA transfer request has been captured (Step 1701).

When it is judged in Step 1701 that no DMA transfer request has been captured, it means that the driver 1404 has not sent any DMA transfer request. Then the processing returns to Step 1701 to wait for capturing of a DMA transfer request.

When it is judged in Step 1701 that a DMA transfer request has been captured, it means that the driver 1404 has sent a DMA transfer request in Step 1503 of FIG. 15. Then the data transfer processing module 1415 of the hypervisor 1410 reads the requested data and address from the host memory 1408 (Step 1702). Step 1702 corresponds to Steps 1504 and 1505 of FIG. 15.

Next, the address conversion processing module 1411 of the hypervisor 1410 refers to the address conversion table 1412 and converts the read address (Step 1703).

The data transfer processing module 1415 writes in the bridge memory 124 the read data and the address obtained by the conversion in Step 1703 (Step 1704). Step 1704 corresponds to Step 1506 of FIG. 15.

Next, the data transfer processing module 1415 judges whether the writing in Step 1704 has succeeded or not (Step 1705). This can be judged by the same method as in Step 1004 of FIG. 10.

In a case where the writing is judged as a "failure" in Step 1705, the processing returns to Step 1704 where writing of the data and the address is executed again.

In a case where the writing is judged in Step 1705 as a "success", on the other hand, the DMA transfer request processing module 1414 of the hypervisor 1410 issues a DMA transfer request to the DMA engine 143 (Step 1706). Step 1706 corresponds to Step 1508 of FIG. 15.

The hypervisor 1410 thus completes the processing.

Effects of the first to third embodiments of this invention will be described next.

Figure 18:
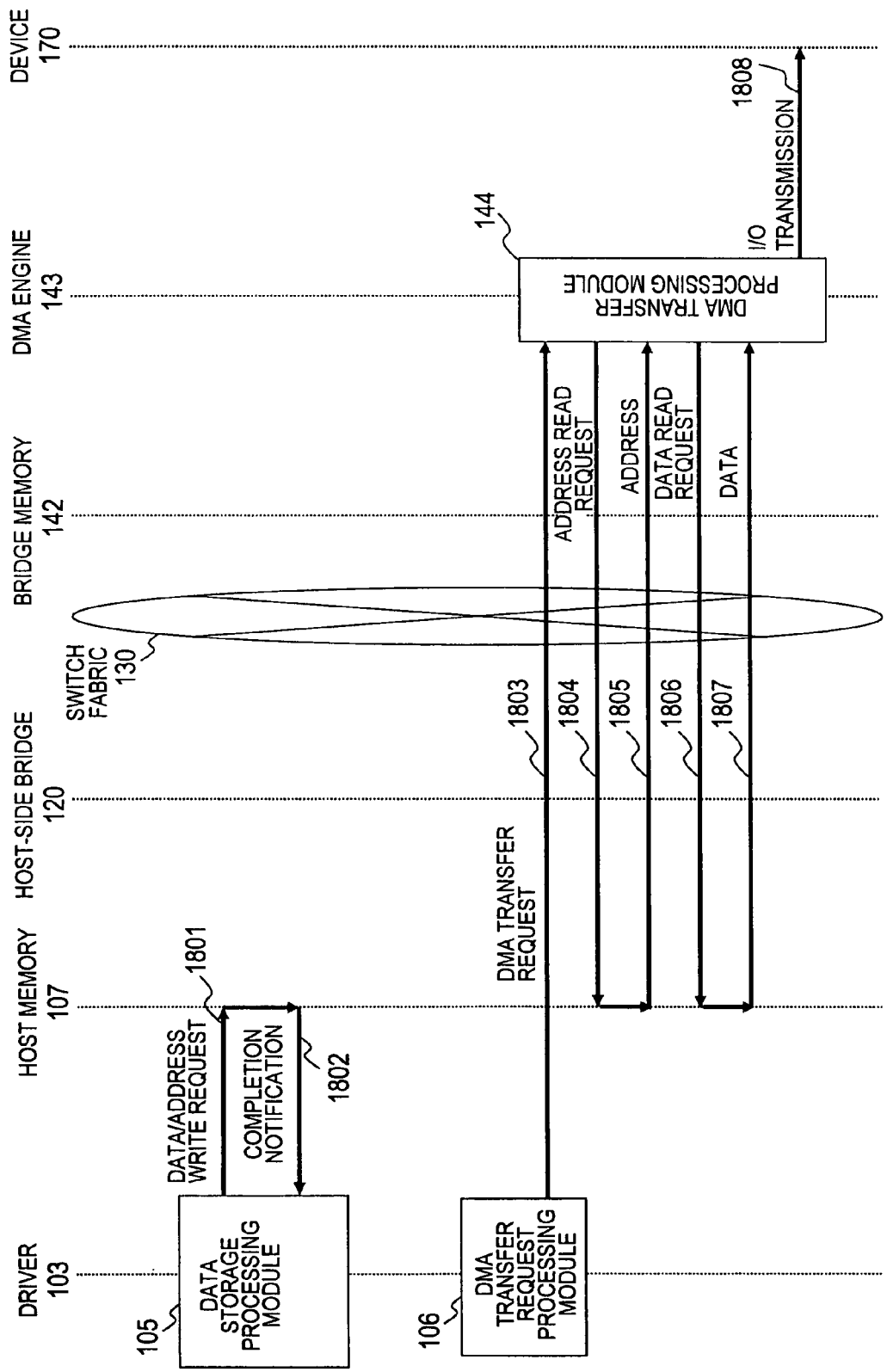
FIG. 18 is a sequence diagram showing data transfer processing that is executed in a conventional remote I/O system.

FIG. 18 is a sequence diagram showing data transfer processing that is executed in a conventional remote I/O system.

Specifically, FIG. 18 shows processing executed to transfer data from the host PC 100 to the device 170 when this invention is not applied to the remote I/O system shown in FIG. 1.

First, the data storage processing module 105 of the driver 103 issues a write request for storing in the host memory 107 data that is to be transferred and an address in the host memory 107 at which the data is to be stored (Step 1801). After the data and the address are stored, the driver 103 receives a completion notification (Step 1802).

Next, the DMA transfer request processing module 106 of the driver 103 sends a DMA transfer request to the DMA transfer processing module 144 of the DMA engine 143 (Step 1803).

Receiving the DMA transfer request of Step 1803, the DMA transfer processing module 144 issues an address read request to the host memory 107 (Step 1804). As a result, an address stored in the host memory 107 is read (Step 1805). The address read in Step 1805 is the address that has been stored as requested by the write request of Step 1801.

The DMA transfer processing module 144 next issues a data read request to the host memory 107 (Step 1806). This read request is for data at the address read in Step 1805. As a result, the data to be transferred is read from the host memory 107 at the address read in Step 1805 (Step 1807). The data read in Step 1807 is the data that has been stored as requested by the write request of Step 1801.

The DMA transfer processing module 144 then sends the data read in Step 1807 to the device 170 (Step 1808).

Data transfer from the host PC 100 to the device 170 is completed as above.

As shown in FIG. 18, the conventional remote I/O system executes the transmission of a DMA transfer request (Step 1803), the address read processing in the DMA engine 143 (Steps 1804 and 1805), and the data read processing in the DMA engine 143 (Steps 1806 and 1807) through the switch fabric 130.

In a local I/O system, the host PC 100 and the device 140 are connected directly to each other without the switch fabric 130 being interposed between the two. Therefore, in the data transfer of FIG. 18, the local I/O system executes the processing of Steps 1803 to 1807 without the intermediation of the switch fabric 130.

Figure 19:
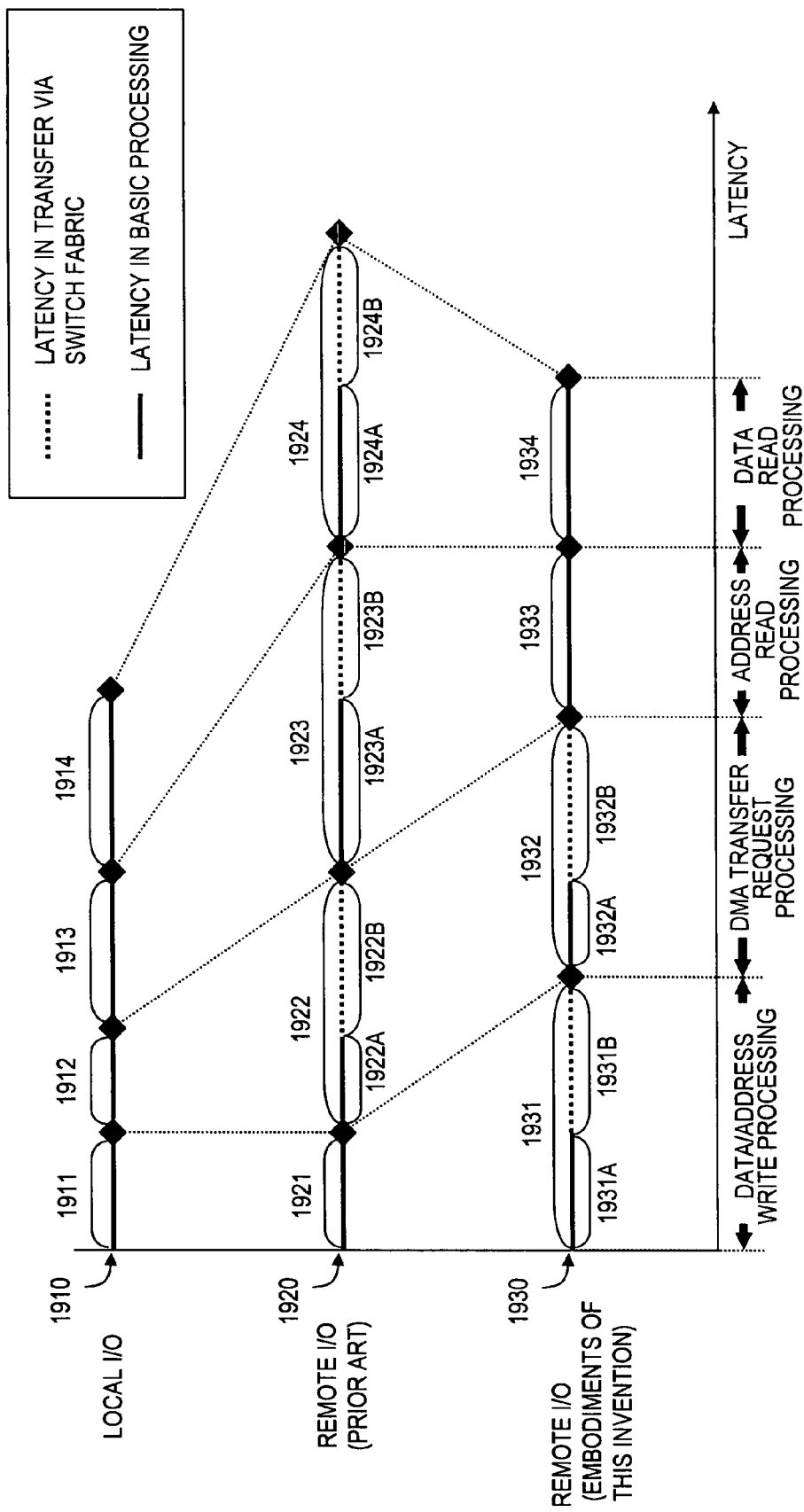
FIG. 19 is an explanatory diagram of effects of the embodiments of this invention.

FIG. 19 is an explanatory diagram of effects of the embodiments of this invention.

Specifically, FIG. 19 is a comparative diagram of the latency in data transfer. In FIG. 19, the horizontal axis shows the latency (i.e., delay time) in data transfer, and different latency types are represented by the solid line and the broken line. The solid line represents the latency in basic processing, in other words, the latency in transfer that does not involve the switch fabric 130. The broken line represents the latency in transfer that is made via the switch fabric 130.

A latency 1910 in the local I/O system will be described first with reference to FIG. 18. The latency 1910 is made up of latencies 1911, 1912, 1913, and 1914.

The latency 1911 is a time necessary for the driver 103 to write data and an address in the host memory 107. Specifically, the latency 1911 is a time required for Steps 1801 and 1802 of FIG. 18.

The latency 1912 is a time necessary for the driver 103 to send a DMA transfer request to the DMA engine 143. Specifically, the latency 1912 is a time required for Step 1803 of FIG. 18. However, in the local I/O system, the DMA transfer request in Step 1803 does not pass through the switch fabric 130.

The latency 1913 is a time necessary for the DMA engine 143 to read an address from the host memory 107. Specifically, the latency 1913 is a time required for Steps 1804 and 1805 of FIG. 18. However, in the local I/O system, the address in Steps 1804 and 1805 is not read via the switch fabric 130.

The latency 1914 is a time necessary for the DMA engine 143 to read data from the host memory 107. Specifically, the latency 1914 is a time required for Steps 1806 and 1807 of FIG. 18. However, in the local I/O system, the data in Steps 1806 and 1807 is not read via the switch fabric 130.

Described next is a latency 1920 in data transfer in the remote I/O system to which this invention is not applied. The latency 1920 is made up of latencies 1921, 1922, 1923, and 1924.

The latency 1921 is a time necessary for the driver 103 to write data and an address in the host memory 107. The latency 1921 is equal to the latency 1911.

The latency 1922 is a time necessary for the driver 103 to send a DMA transfer request to the DMA engine 143. Specifically, the latency 1922 is a time required for Step 1803 of FIG. 18. In this remote I/O system, the DMA transfer request in Step 1803 is sent via the switch fabric 130. The latency 1922 therefore contains a latency 1922B in addition to a latency 1922A, which is equal to the latency 1912. The latency 1922B is a time necessary for the DMA transfer request to pass through the switch fabric 130.

The latency 1923 is a time necessary for the DMA engine 143 to read an address from the host memory 107. Specifically, the latency 1923 is a time required for Steps 1804 and 1805 of FIG. 18. In this remote I/O system, the address in Step 1804 and 1805 is read via the switch fabric 130. The latency 1923 therefore contains a latency 1923B in addition to a latency 1923A, which is equal to the latency 1913. The latency 1923B is a time necessary for the address read request and the read address to pass through the switch fabric 130.

The latency 1924 is a time necessary for the DMA engine 143 to read data from the host memory 107. Specifically, the latency 1924 is a time required for Steps 1806 and 1807 of FIG. 18. In this remote I/O system, the data in Step 1806 and 1807 is read via the switch fabric 130. The latency 1924 therefore contains a latency 1924B in addition to a latency 1924A, which is equal to the latency 1914. The latency 1924B is a time necessary for the data read request and the read data to pass through the switch fabric 130.

The latency in the remote I/O system to which this invention is not applied is thus longer than the latency in the local I/O system by the length of time necessary for a request, data, and the like to pass through the switch fabric 130 (specifically, the latencies 1922B, 1923B, and 1924B).

A latency 1930 in data transfer in a remote I/O system to which this invention is applied will be described next. The latency 1930 is specifically the latency in the data transfer described in the second embodiment of this invention with reference to FIG. 12. The latency 1930 is made up of latencies 1931, 1932, 1933, and 1934.

The latency 1931 is a time necessary for the driver 1102 to write data and an address in the bridge memory 142. Specifically, the latency 1931 is a time required for Steps 1201 and 1202 of FIG. 12. The data and address in Steps 1201 and 1202 are written via the switch fabric 130. The latency 1931 therefore contains a latency 1931B in addition to a latency 1931A, which is equal to the latency 1911. The latency 1931B is a time necessary for the write request and the notification completion to pass through the switch fabric 130.

The latency 1932 is a time necessary for the driver 1102 to send a DMA transfer request to the DMA engine 143. Specifically, the latency 1932 is a time required for Step 1203 of FIG. 12. The DMA transfer request in Step 1203 is sent via the switch fabric 130. The latency 1932 therefore contains a latency 1932A, which is equal to the latency 1912, and a latency 1932B, which is equal to the latency 1922B.

The latency 1933 is a time necessary for the DMA engine 143 to read an address from the bridge memory 142. Specifically, the latency 1933 is a time required for Steps 1204 and 1205 of FIG. 12. The address in Steps 1204 and 1205 is not read via the switch fabric 130. The latency 1933 is therefore equal to the latency 1913 in the local I/O system.

The latency 1934 is a time necessary for the DMA engine 143 to read data from the bridge memory 142. Specifically, the latency 1934 is a time required for Steps 1206 and 1207 of FIG. 12. The data in Steps 1206 and 1207 is not read via the switch fabric 130. The latency 1934 is therefore equal to the latency 1914 in the local I/O system.

Compared with the latency 1920, which contains three latencies generated due to the involvement of the switch fabric 130 (the latencies 1922B, 1923B, and 1924B), the latency 1930, which contains two latencies generated due to the involvement of the switch fabric 130 (the latencies 1931B and 1932B), is shorter by the length of time necessary to execute processing that involves the switch fabric 130 once.

The reason behind this difference is as follows:

The driver 1102 (or other drivers) which writes data knows in advance an address in a memory at which data to be transferred is to be stored. The driver 1102 (or other drivers) can therefore write both the data and the address in the memory at the same time.

On the other hand, the DMA engine 143 which reads data does not know at which address in the memory the data to be transferred is currently stored. The DMA engine 143 therefore reads first the address from a predetermined area in the memory, and then reads the data from an area that is indicated by the read address. The DMA engine 143 thus needs to execute the address read processing and the data read processing sequentially.

In prior art, the processing in which the DMA engine 143 reads data from the host memory 107 is executed through the switch fabric 130. This means that the address read processing and the data read processing are executed through the switch fabric 130, and two latencies (the latency 1923B and the latency 1924B) are generated from these two separate processing procedures.

In the embodiments of this invention where the bridge memory 142 is provided on the side of the device 140, the driver 1102 (or other drivers) executes processing of writing data in the bridge memory 142 via the switch fabric 130. An address is written in this write processing at the same time the data is written and, accordingly, one latency (the latency 1931B) is generated from a single processing procedure that involves the switch fabric 130. In other words, a latency for executing processing that involves the switch fabric 130 once is concealed. The embodiments of this invention thus reduce the number of processings that involve the switch fabric 130, thereby making the latency shorter than in conventional processing and ultimately improving the throughput in data transfer.

As shown in FIG. 19, according to the embodiments of this invention, the latency is shortened by a certain amount each time transfer is executed. The throughput can therefore be improved even in data transfer of small granularity (where small-sized data is transferred many times).

In Step 1201 of FIG. 12, it is also possible to write only one of the data and the address in the bridge memory 142 as described in the second embodiment of this invention. For instance, when the address alone is written, the data read request of Step 1206 and the read data of Step 1207 are communicated via the switch fabric 130. This adds a latency equal to the latency 1924B to the latency 1934 of the data read processing in FIG. 19, making the latency in the embodiments of this invention equal to the latency in prior art.

However, the latency in the embodiments of this invention can still be shorter than the latency in prior art. The processing that involves the switch fabric 130 in this case is transmission of the write request of Step 1201 to the bridge memory 142, transmission of the completion notification of Step 1202 in response to the write request, transmission of the DMA transfer request of Step 1203, transmission of the data read request of Step 1206, and transmission of the response data of Step 1207. If Posted Write is applied to the writing of Steps 1201 and 1202, the driver 1102 can execute the next processing without waiting for the completion notification of Step 1202, which makes it possible to ignore the latency generated by the involvement of the switch fabric 130 in the processing of Steps 1201 and 1202. In short, the latency 1931B of FIG. 19 is eliminated and the total latency in the embodiments of this invention becomes shorter than the latency in prior art. The same applies to a case in which the data alone, or the data and the address both are written in Step 1201.

When Posted Write is applied, however, the completion of the writing in Step 1201 has to be confirmed by other measures than the completion notification of Step 1202.

The only requests that are sent via the switch fabric 130 in the prior art shown in FIG. 18 are the DMA transfer request of Step 1803 and the read request of Steps 1805 to 1807. Therefore, applying Posted Write to the prior art cannot shorten the latency of processing that involves the switch fabric 130.

The latency 1930 of FIG. 19 represents the latency in the data transfer described in the second embodiment of this invention with reference to FIG. 12. Compared to the data transfer of FIG. 12, the data transfer of FIG. 3 which is described in the first embodiment of this invention and which involves the host-side bridge 120, is longer in latency by the length of time required for Steps 301 to 305 and Step 308 of FIG. 3. However, none of Steps 301 to 305 and 308 includes communicating via the switch fabric 130. Further, the remote I/O system of the first embodiment can improve the latency by transferring data in bursts.

In the data transfer described in the modification example of the first embodiment of this invention with reference to FIG. 8, DMA transfer requests are issued from the host-side bridge 720. This makes the latency in the data transfer of the modification example shorter than in the first embodiment shown in FIG. 3 by the length of time required for Step 308. Also, the driver 702 executes less processing in the modification example of the first embodiment than in other embodiments. It is therefore easy to build a driver for implementing the modification example of the first embodiment.

The procedures executed in the data transfer that is described in the third embodiment of this invention with reference to FIG. 15 are almost the same as those executed in the first embodiment. The third embodiment therefore provides substantially the same latency improving effect as that of the modification example of the first embodiment. The difference is that, in the third embodiment where the hypervisor 1410 executes major processing, a conventional driver can be used as the driver 1404 without any alterations to the conventional driver.

The description given above is about the effects obtained in the case where the host PC 100 is connected to the devices 140 or the like via the switch fabric 130. The same effects can be expected by applying the embodiments of this invention no matter what type of path is used to connect the host PC 100 to the devices 140 or the like if a latency is generated in data access made via the path.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
   a host computer;
   a device that utilizes a DMA engine to execute data I/O between the host computer and an appliance; and
   a network which connects the host computer and the device,
   wherein the device is coupled to the network via a device bridge, wherein the device bridge includes a bridge memory,
wherein the host computer includes a host memory, which contains address conversion information that includes associations between addresses in the host memory and corresponding addresses in the bridge memory, and a device driver, which controls data transfer to the device,
wherein the device driver is configured to:
when data to be transferred to the appliance is written in the host memory, convert a first address in the host memory at which the data is written into a first address in the bridge memory that corresponds to the first address in the host memory according to the address conversion information;
write the data in an area within the bridge memory that is indicated by the first address in the bridge memory;
write the first address in the bridge memory to a second area within the bridge memory; and
send a data transfer request to the DMA engine through the device bridge, and
wherein the DMA engine is configured to:
upon reception of the data transfer request, read the first address in the bridge memory from the second area within the bridge memory;
read the data from the area within the bridge memory that is indicated by the read first address in the bridge memory; and
transfer the data to the appliance.

2. A computer system, comprising:
a host computer;
a device that utilizes a DMA engine to execute data I/O between the host computer and an appliance; and
a network which connects the host computer and the device,
wherein the device is coupled to the network via a device bridge,
wherein the device bridge includes a bridge memory,
wherein the host computer includes a host memory, which contains address conversion information that includes associations between addresses in the host memory and corresponding addresses in the bridge memory, and a device driver, which controls data transfer to the device,
wherein the device driver is configured to:
when data to be transferred to the appliance is written in the host memory, convert a first address in the host memory at which the data is written into a first address in the bridge memory that corresponds to the first address in the host memory according to the address conversion information;
write the data in an area within the bridge memory that is indicated by the first address in the bridge memory;
write the first address in the bridge memory in an area within the host memory; and
send a data transfer request to the DMA engine through the device bridge, and
wherein the DMA engine is configured to:
read, upon reception of the data transfer request, the first address in the bridge memory from the area within the host memory;
read the data from the area within the bridge memory that is indicated by the read first address in the bridge memory; and
transfer the data to the appliance.

3. The computer system according to claim 1, wherein the network comprises a switch fabric containing one or more switches.

* * * * *